May 5, 1942.  W. H. ROBERTSON  2,281,803
CASH REGISTER
Filed Nov. 16, 1938  8 Sheets-Sheet 4
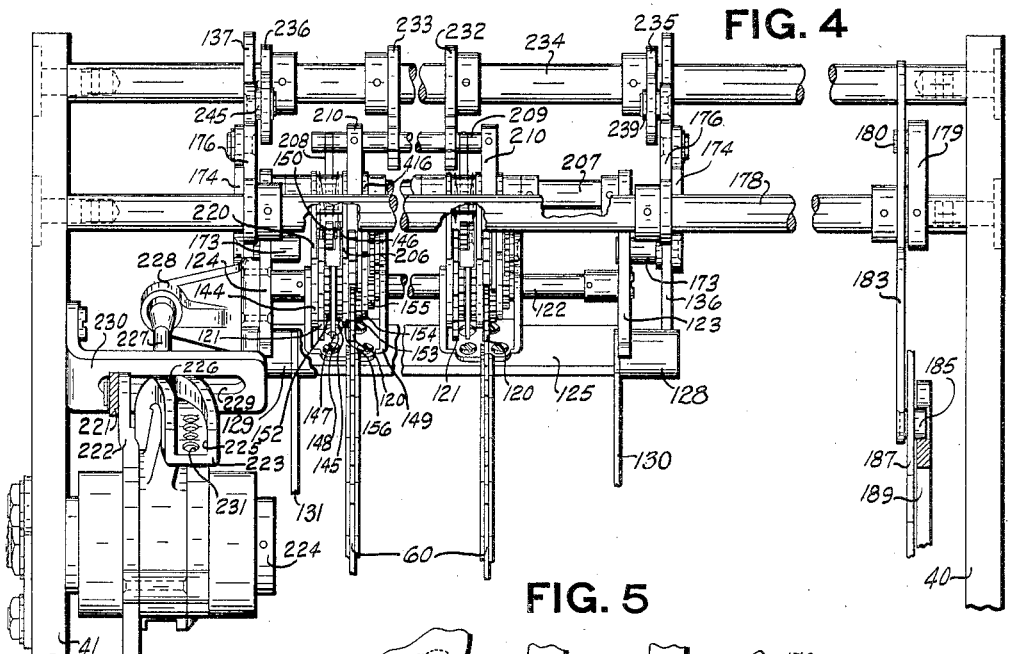
FIG. 4
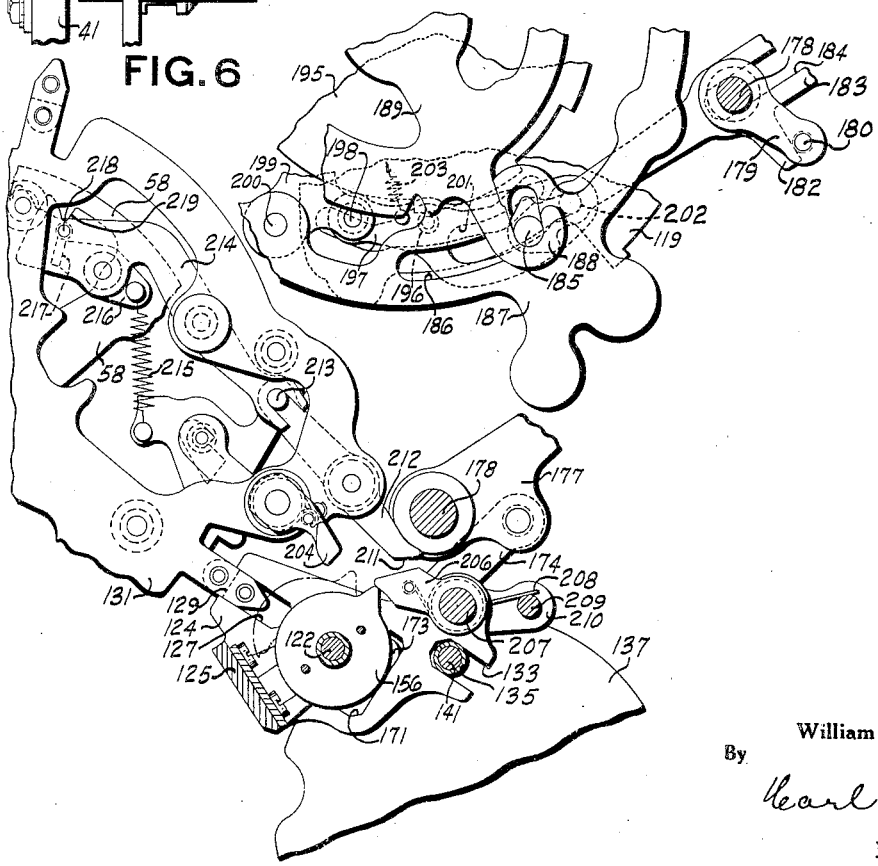
FIG. 5
FIG. 6
Inventor
William H. Robertson
By Earl Benst
His Attorney

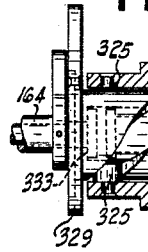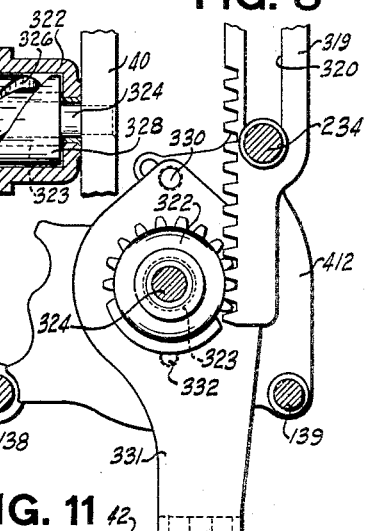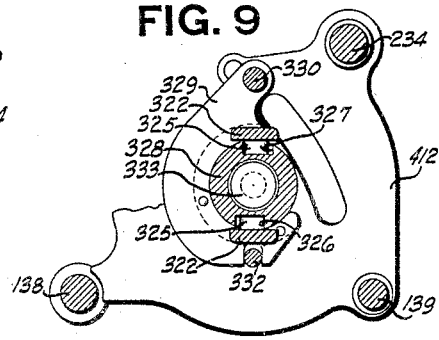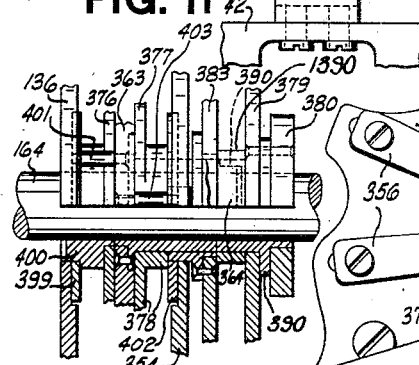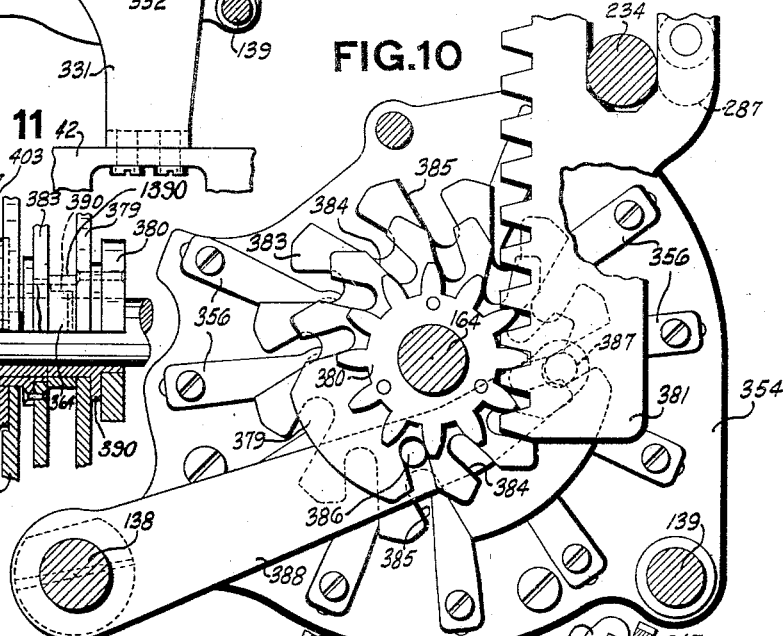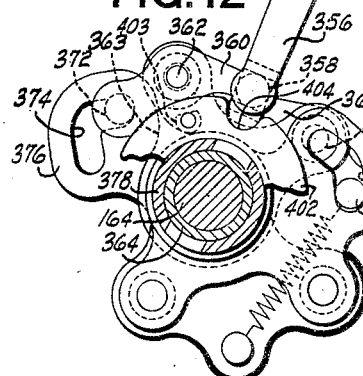

May 5, 1942. W. H. ROBERTSON 2,281,803
CASH REGISTER
Filed Nov. 16, 1938 8 Sheets-Sheet 6
FIG. 14
FIG. 15
FIG. 16
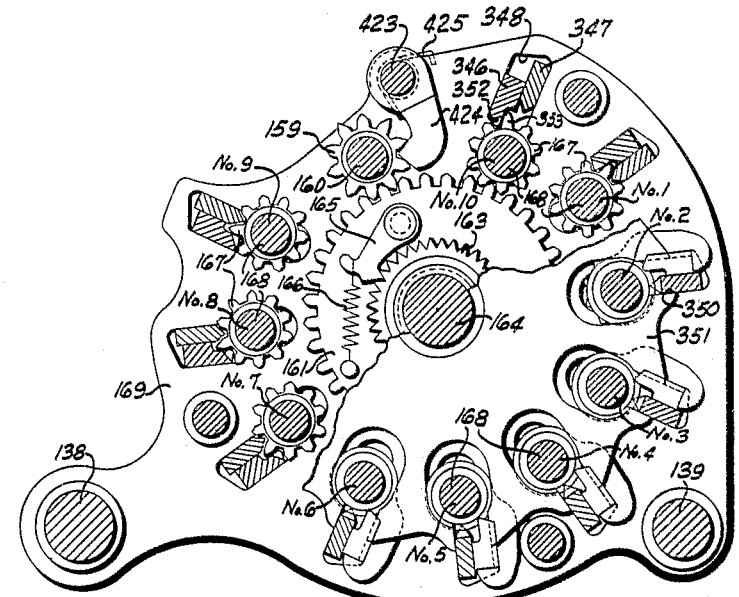
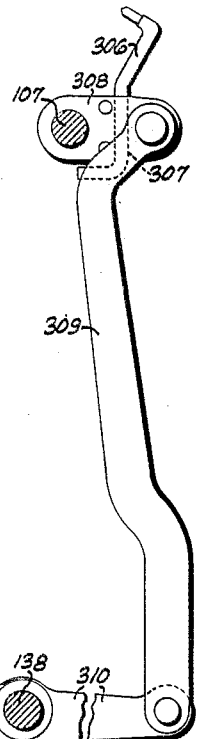
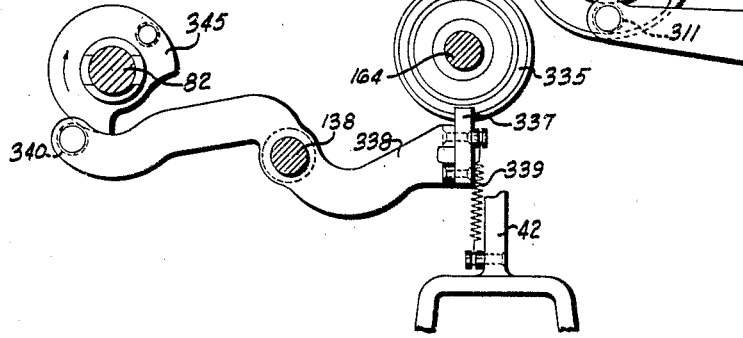
Inventor
William H. Robertson
By Pearl Benst
His Attorney May 5, 1942.  W. H. ROBERTSON  2,281,803
CASH REGISTER
Filed Nov. 16, 1938  8 Sheets-Sheet 7

Inventor
William H. Robertson
By
Earl Benst
His Attorney

Inventor
William H. Robertson
By
Earl Benst
His Attorney

Patented May 5, 1942

2,281,803

UNITED STATES PATENT OFFICE 2,281,803

CASH REGISTER

William H. Robertson, Dayton, Ohio, assignor to The National Cash Register Company, Dayton, Ohio, a corporation of Maryland Application November 16, 1938, Serial No. 240,819

20 Claims. (Cl. 235—2)

This invention relates to the type of cash register commonly referred to as an accounting machine, and is particularly directed to the totalizer mechanisms of machines of the type disclosed in United States Patents Nos. 1,242,170 and 1,394,256, issued, respectively, October 9, 1917, and October 18, 1921, to F. L. Fuller, and Patents No. 1,619,796 and No. 1,747,397, issued, respectively, March 1, 1927, and February 18, 1930, to B. M. Shipley.

In recent years, machines of the class referred to above have come into prominent use by large merchandising establishments for the analysis of the sales of a large variety of commodities marketed by said merchandising establishment. For example, a large electrical company manufacturing and marketing electrical appliances may wish to keep a complete sales analysis of each of the leading electrical appliances marketed thereby. Likewise, a department store or large grocery store may wish to keep a perpetual inventory of the value of the goods in certain departments, or a perpetual inventory of a number of items marketed thereby.

Obviously, an accounting machine having devices for retaining a large number of separate totals is best suited to the types of work referred to above. Therefore, broadly, it is one object of this invention to provide a machine of the class referred to above with a large number of separate total storage devices arranged so as to occupy minimum space and so as not to interfere in any way with the established functions of the machine.

Another object is the provision of a large number of individual storage devices and a single computing device for computing amounts to be stored in all the storage devices, to obtain a plurality of individual totals.

Another object of the present invention is to supply a plurality of storage devices constructed so as to occupy minimum space and adapted to be actuated by a single computing device or balance totalizer which forms an operating connection between the machine proper and said storage devices for the purpose of carrying on adding and subtracting operations, the results of which are stored in the selected storage, and for the purpose of recording the totals retained in any of the storage devices.

A further object is to provide means whereby a single balance totalizer is adapted to combine positive or negative amounts set up on the keyboard with amounts retained in any of a plurality of storage devices to obtain a plurality of individual totals.

Another object of the present invention is to provide means whereby a single balance totalizer is adapted to receive an amount stored in any one of a plurality of storage devices, combine that amount with a positive or negative amount set up on the keyboard of the machine, and enter the total or combined amount in the selected storage device.

Another object is the provision of novel means for selecting any one of a series of lines, each supporting a plurality of sets of storage devices, for selecting any one of the storage devices on the selected line for actuation by a computing device and for shifting the line to operatively connect the selected storage device with the computing device.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 4 is a detail view, as observed from a point directly above the machine, showing the mechanism for shifting the balance totalizer from adding position to subtracting position and vice versa, and also showing a portion of the engaging mechanism for the balance totalizer.

Fig. 5 is a detail view of a part of the mechanism for controlling the engaging and disengaging of the balance totalizer.

Fig. 6 is a detail view of a part of the transfer mechanism for the balance totalizer, and the means whereby the balance totalizer controls the positioning of the machine differential in total recording operations.

Fig. 7 is a detail view of the cam for shifting the actuators for the storage devices laterally to select the different sets of said storage devices.

Fig. 8 is a detail view of the mechanism for operating the cam shown in Fig. 7.

Fig. 9 is a sectional view, as observed from the right of the machine, of the cam shown in Fig. 7.

Fig. 10 is a detail view of the selecting and operating mechanism for the mechanism which controls the engaging of the selected storage device with the auxiliary actuators.

Fig. 11 is a front view, partially sectioned, of the storage device selecting and engaging mechanism shown principally in Figs. 10, 12, and 13.

Fig. 12 is a detail view of a part of the mechanism for selecting and engaging the various storage devices with their actuators.

Fig. 13 is a detail view of one of the storage device engaging arms and a part of the mechanism associated therewith.

Fig. 14 is a fragmentary sectional view, as observed from the right of the machine, illustrating the different lines of storage devices and the actuating mechanism associated therewith.

Fig. 15 is a detail view of the aliner for the transaction differential mechanism and the operating mechanism for this aliner.

Fig. 16 is a detail view of the mechanism for alining the actuators for the storage devices, in their set positions.

*General description*

Figure 1:
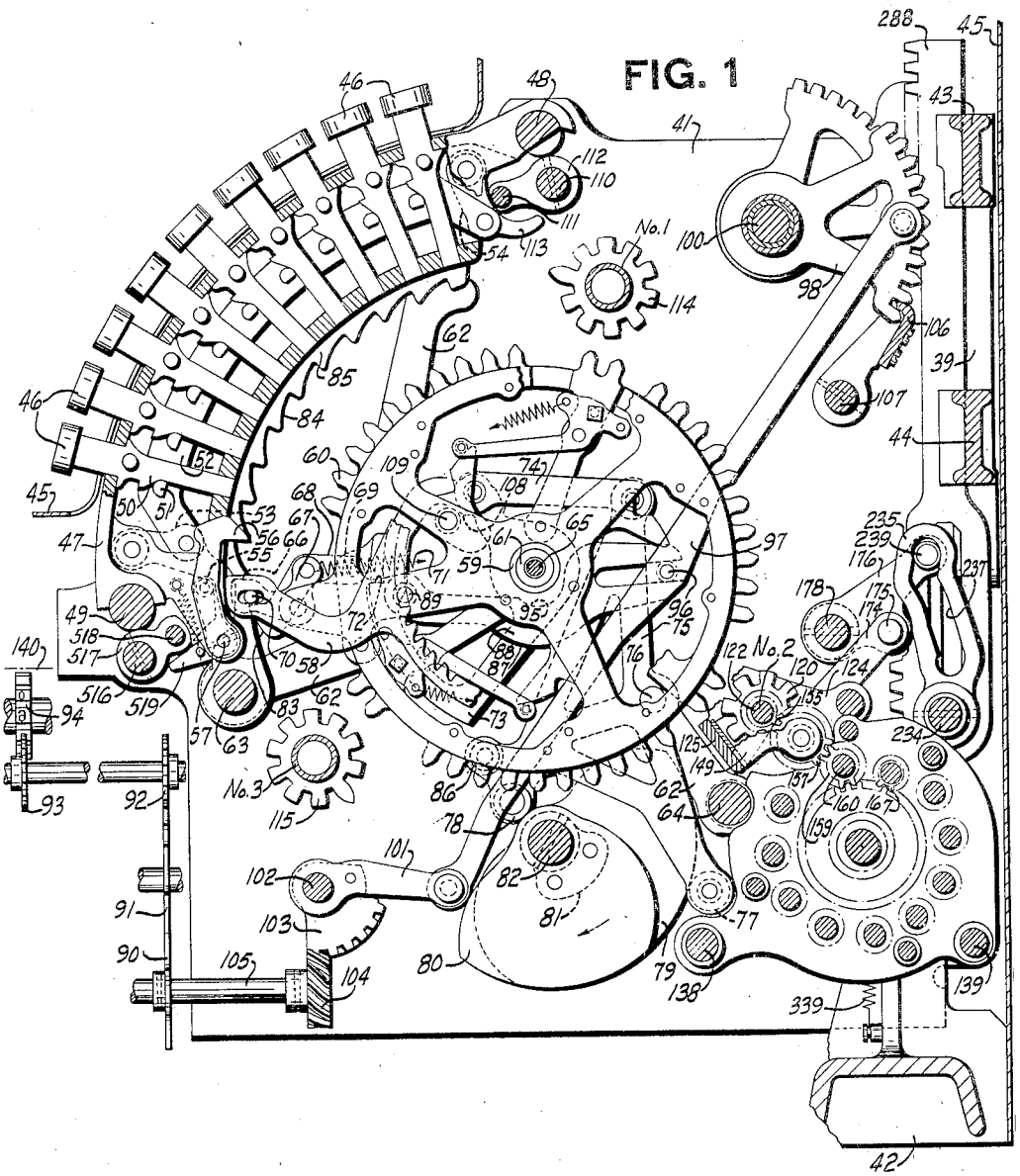
Fig. 1 is a cross-sectional view of the machine proper taken just to the right of one of the amount banks, and shows, in particular, said amount bank, its associated differential mechanism, and the denominational order of the balance totalizer and storage devices actuated by this particular differential mechanism.

The machine embodying the instant invention has a plurality of denominational rows of amount keys, which control the positioning of their corresponding main differential actuators, which actuators in turn control the positioning of corresponding type wheels and, if desired, corresponding indicators. The main actuators are also arranged to actuate two main sets of totalizers commonly known as an upper and a front totalizer line, each having ten sets of totalizer wheels thereon. While ten totalizers are provided on each of the upper and front totalizer lines, in the instant embodiment only four totalizers on the upper line and seven on the front line are utilized.

A row of transaction keys for each of the main sets of totalizers controls the selection of the different sets of totalizer wheels for engagement with the amount differentials, and in adding operations controls means which causes said totalizer wheels to be engaged with said differentials.

The well known total control lever is provided for controlling the adding and total printing functions of the machine. In total printing operations, often referred to as read and reset operations, the total control lever also controls means to cause the selective engagement of one or the other of the two main sets of totalizers with the amount actuators, in which case the transaction keys for the selected main set of totalizers merely select the different totalizers of the set and have nothing to do with the engaging of said totalizers with the amount actuators.

In adding operations the main actuators, during their initial movements, are positioned under control of the depressed amount keys, and at the same time the selected totalizer line or lines are shifted laterally to aline the selected set of wheels thereon with said actuators.

After the actuators have been positioned in proportion to the depressed amount keys, the wheels of the selected totalizer are engaged therewith, and return movement of said actuators rotates said wheels to add therein the amount set up on the keyboard.

Adding and subtracting operations are effected by one cycle of movement of the operating mechanism, whereas total printing operations require two cycles of movement of said operating mechanism. The cycle controlling mechanism is not shown in the present application. However, this mechanism is well known in the art and is fully disclosed in the patents referred to at the beginning of this specification.

The first cycle of a total printing operation is utilized to shift the selected totalizer line laterally to bring the selected set of wheels thereon into register with the main actuators, and during this first cycle the zero stop pawls break the latches for said main differential actuators in zero positions. Consequently, said actuators do not move away from zero. In the first cycle, immediately after the selected set of totalizer wheels has been moved into register with the actuators, said wheels are moved into engagement with said actuators. During the second cycle of a total printing operation, initial movement of the main actuators reversely rotates the wheels of the selected totalizer until a long tooth on each of said wheels, upon arrival at zero position, actuates mechanism which stops the main actuators in positions corresponding to the amount on said set of totalizer wheels.

In sub-total or reading operations, the selected set of totalizer wheels remains in engagement with the actuators during their return movement and are consequently restored to their original positions, to reenter the total therein. In total or resetting operations, after initial movement of the actuators in the second cycle of such operation has returned the selected set of totalizer wheels to zero, said wheels are disengaged therefrom and consequently remain in a zeroized condition.

In addition to the two main totalizers just described, the present machine is equipped with ten lines of storage wheels, each line having ten sets of storage wheels thereon, thus providing means for storing 100 separate totals, which is a very desirable feature when the machine is used in connection with certain business systems.

The ten lines of storage wheels are arranged in a circle around ten auxiliary actuators, one for each denominational order of storage wheels. The auxiliary actuators are arranged to slide laterally in relation to the ten sets of storage wheels to select said sets of storage wheels for actuation. The storage wheels have no transfer mechanism and all the totals stored therein are computed in a single balance totalizer, which forms a connection between the auxiliary actuators and the main actuators of the machine proper. As the storage wheels have no transfer mechanism, obviously they do not pass through zero, each of said storage wheels having a long tooth, which, in cooperation with stop mechanism, locates said wheels in zero position.

This type of construction makes for compactness and permits the storing of 100 totals in a minimum of space, a very desirable feature, which permits the incorporation of such a device in a standard machine.

While the storage device or unit embodied in the instant invention is arranged for storing 100 totals, it is not the desire to limit the machine of this invention to the storage of any certain number of totals, as it is obviously within the scope of this invention to increase or decrease the number of storage sets on a line or the number of lines in a storage unit, or to provide additional units, whichever is desirable.

Two rows of transaction keys control the selection of the 100 storage sets. One row of keys controls the lateral shifting of the auxiliary actuators to select the different sets of storage wheels on the various lines, and the other row of keys controls the selection of the ten lines for engagement of the selected set of wheels thereon with the auxiliary actuators.

The balance totalizer is mounted in a framework which is shiftable forwardly and rearwardly to disconnect the balance totalizer, which is normally connected to the auxiliary actuators, from said actuators and to connect said totalizer to the main actuators and vice versa. The framework supporting the balance totalizer is also adapted to shift horizontally to bring either the adding or subtracting wheels thereof into register with the main actuators, depending upon whether an adding or subtracting operation is being performed in said balance totalizer. The horizontal shifting of the totalizer is controlled by a split row of transaction keys, part of which are adding keys and part of which are subtracting keys. The timing of the forward and rearward shifting of the balance totalizer is governed by the regular total control lever.

In adding operations, upward movement of the main actuators positions said actuators in proportion to the depressed amount keys. While the main actuators are being thus positioned, the selected set of storage wheels are engaged with the auxiliary actuators and the auxiliary actuators are driven. As the balance totalizer is also connected to the auxiliary actuators at this time, movement of said actuators turns the selected set of storage wheels to zero and enters the amount thereon in the wheels of the previously zeroized balance totalizer. Before the main actuators start their return movement, the balance totalizer is disconnected from the auxiliary actuators and connected to the main actuators, whereupon return movement of said main actuators rotates said wheels in an additive direction proportionately to the amount set up on the keyboard. The balance totalizer now contains an amount which is a combination of the amount stored on the selected set of storage wheels and that set up on the amount keys.

After the main actuators have completed their return movements, the balance totalizer is disconnected therefrom and reconnected to the auxiliary actuators, and remain thus connected at the end of a machine operation. Likewise the selected set of storage wheels remain in engagement with the auxiliary actuators at the end of a machine operation. At the beginning of the next machine operation, the auxiliary actuators turn the balance totalizer to zero and simultaneously enter the amount thereon in the wheels of the selected storage device. Immediately after the new amount has been entered in the wheels of the selected storage device, said wheels are disengaged from the auxiliary actuators and the set of storage wheels selected for the present operation are immediately engaged therewith and return movement of the auxiliary actuators rotates said wheels to zero and enters the amount thereon in the zeroized balance totalizer and the adding operation is continued as explained above.

In subtracting operations, the amount on the selected set of storage wheels is first entered in the plus side of the zeroized balance totalizer, and while the balance totalizer is being disconnected from the auxiliary actuators and connected to the main actuators, said main actuators having been previously positioned under control of depressed amount keys, said balance totalizer is shifted laterally to bring the subtract side thereof into register with the main actuators. Return movement of the main actuators reversely rotates the adding wheels of the balance totalizer to subtract therefrom the amount set up on the keyboard. Near the end of the machine operation, the balance totalizer is again shifted laterally to bring the plus side thereof into register with the main and auxiliary actuators. Near the beginning of the next operation, the balance totalizer is turned to zero and the amount thereon is entered in the wheels of the selected storage device.

As previously explained, sub-total and total operations, often referred to as read and reset operations, consist of two cycles of operation of the machine. Sub-total and total operations in the balance totalizer, as well as the other totalizers of the machine proper, are controlled by the well known total control lever. When it is desired to print totals of amounts in the different storage sets, the total control lever is moved from adding position to the balance totalizer reset position and the proper transaction keys are depressed to select the desired set of storage wheels. During the first cycle of a total operation, the selected set of storage wheels are engaged with the auxiliary actuators and reversely rotated thereby to zero, to enter the amount thereon in the zeroized balance totalizers.

Right at the end of the first cycle of operation, the balance totalizer is disconnected from the auxiliary actuators and connected to the main actuators, whereupon initial movement of said main actuators, at the beginning of the second cycle of operation, reversely rotates said balance totalizer wheels to zero position, causing said main actuators to be positioned in proportion to the value standing on the wheels at the beginning of the operation, said actuators in turn positioning the indicating and printing mechanisms. After the wheels of the balance totalizer have been turned to zero and prior to return movement of the main actuators, said wheels are disconnected from the main actuators and reconnected to the auxiliary actuators. Inasmuch as the balance totalizer wheels are standing at zero, nothing will be entered in the selected set of storage wheels at the beginning of the succeeding operation, and as a result, said storage wheels will remain in a zeroized condition.

The only difference between a total and subtotal or reset and read operation is that during the last cycle of a sub-total operation the wheels of the balance totalizer remain connected to the main actuators during their return movement and consequently are returned thereby to their original positions, and in the beginning of the succeeding operation this amount is reentered on the selected set of storage wheels.

In the ensuing pages the mechanism pertinent to the instant invention will be described in detail, and for a thorough description of all other mechanisms, which are more or less standard and well known in the art, reference may be had to the patents listed at the beginning of this specification.

DETAILED DESCRIPTION

Framework and operating mechanism

The mechanism of the machine is supported by a right frame 40 (Figs. 1, 3 and 4) and a left frame 41, said frames being secured to a machine base 42, and fixed in rigid relation to each other by various cross frames, rods and a back frame 39 comprising two cross bars 43 and 44. A suitable case or cabinet 45 encloses the mechanism of the machine and is secured to the machine base 42.

Normally the machine is operated by a conventional type of start-stop electric motor. However, a hand crank is also provided for emergency operation of the machine. The operating motor and crank are not here illustrated, but as they are well known in the art, illustration and further description thereof are believed unnecessary.

Amount entering mechanism

The machine embodying the instant invention has a plurality of rows of amount keys 46 (Figs. 1 and 23) assembled in a key frame 47, secured between rods 48 and 49 supported by the frames 40 and 41. Inasmuch as all the amount banks are similar in construction, it is believed that a description of the amount bank shown in Fig. 1, and its associated mechanisms, will be sufficient. Each of the amount keys 46 has a camming extension 50, adapted to cooperate with a corresponding stud 51 in a control plate 52, opposite ends of which are pivotally connected to companion links 53 and 54, in turn pivoted to the key frame 47.

Depressing one of the keys 46 causes the camming extension 50, in cooperation with the stud 51, to shift the plate 52 downwardly until a shoulder, formed on said camming extension 50, passes beyond the flat surface of said stud 51, whereupon the control plate 52 is spring-returned a slight distance upwardly to latch the flat surface of the stud over the shoulder, to retain the key in depressed position. After one amount key has been depressed in a particular row, depressing another key in that same row releases the key previously depressed, thus constituting what is termed flexible key action. Downward movement of the control plate 52 rocks the link 53 clockwise, causing an extension thereof, in cooperation with a stud 55 in a zero stop pawl 56 secured on a short shaft 57 journaled in an extension of the frame 47, to rock said stop pawl counterclockwise. Counterclockwise movement of the zero stop pawl 56 moves a projection on the upper end thereof out of the path of the nose of a reset spider 58 for this particular amount bank. The spider 58 is rotatably supported on a hub 59 of a main actuator 60 for this particular bank, said actuator being free on a hub 61 extending between two similar plates 62 (only one here shown) supported by rods 63 and 64 extending between the frames 40 and 41. A tie rod 65 (Fig. 1) passes through a hole in the center of all of the hubs 61 and securely anchors all the denominational actuator units in fixed relation to each other.

Depressing one of the amount keys 46 moves the lower end of the stem thereof into the path of a nose 66 of a latch operating bell crank 67 pivotally mounted on the actuator 60 and connected by a link 68 to an actuator latch 69 also pivotally connected to the amount actuator 60. A stud 70 in the bell crank 67, in cooperation with a horizontal slot in the nose of the spider 58, operatively connects these two parts for a purpose presently to be described.

A spring 71 (Fig. 1) is tensioned to normally maintain a foot-shaped extension of the latch 69 in engagement with a shoulder 72 of a differential operating segment 73, free on the hub 61. A link 74 pivotally connects the operating segment 73 to an A-shaped operating lever 75 fulcrumed on a stud 76 in the plate 62. Extensions of the lever 75 pivotally support rollers 77 and 78, which cooperate respectively with the peripheries of companion plate cams 79 and 80, connected in fixed relation to each other by a hub 81 secured on a main shaft 82 journaled in the frames 40 and 41.

Depressing the usual starting bar (not shown) closes the switch for the electric motor and renders the clutch mechanism effective to connect the electric motor to the main shaft 82, and said motor then drives the shaft 82 one clockwise revolution when the total control lever is in adding position, and two clockwise revolutions when the total control lever is in reading or resetting position. After the main shaft 82 has made the proper number of revolutions, the clutch mechanism is automatically disengaged and the motor switch is automatically opened to terminate operation of the machine.

In adding operations, clockwise movement of the main shaft 82 causes the cams 79 and 80 to rock the lever 75 first clockwise, which movement, by means of the link 74, is transmitted to the operating segment 73. Clockwise movement of the segment 73 causes the shoulder 72, in cooperation with the latch 69, to carry the actuator 60 clockwise in unison therewith until the nose 66 of the bell crank 67 engages the depressed amount key. This rocks the latch 69 out of engagement with the shoulder 72 and simultaneously engages a foot-shaped extension 83 of the link 68 with the corresponding one of a series of arcuate locking notches 84 in a curved plate 85 secured to extending arms of the plate 62. This locates and locks the actuator 60 in a position corresponding to the depressed amount key, after which the segment 73 and connected mechanism are free to complete their clockwise movements, during which time an arcuate surface on the segment 73 retains the latch 69 in disengaged position.

When the lever 75 nears the terminus of its initial movement clockwise, a roller 86 carried thereby engages an arcuate surface 87 on a beam 88 pivoted at 89 to the actuator 60 and forces a curved recess 95, in the upper edge thereof, into contact with the hub 59, to differentially position said beam in proportion to the depressed amount key. A slot in the rearward end of the beam 88 engages a stud 96 in a link 97, the upper end of which is pivotally connected to an indicator segment 98 mounted on one of a series of nested tubes free on an indicator shaft 100 journaled on trunnions in the frames 40 and 41. The lower end of the link 97 is pivotally connected to a printer arm 101 free on a shaft 102 journaled in the frames 40 and 41, and said arm 101 is integral with a printer gear sector 103, the teeth of which mesh with a pinion 104 secured on one end of a shaft 105, journaled in the printer framework (not shown). Fast on the shaft 105 (Fig. 1) is a gear 90 meshing with teeth on a rack 91 mounted to slide horizontally in the printer framework. Other teeth on the rack 91 mesh with a pinion 92 connected by a tube to a type wheel drive pinion 93 which meshes with tooth spaces cut in a type wheel 94, for this particular order. Upon a machine operation, a printing hammer (not shown) carries a record strip 140 and an inking ribbon (not shown) into contact with the type wheel 94 to print the amount on said record strip.

The link 97 transmits the differential positioning of the beam 88 to the indicator segment 98, which in turn causes the front and back indicators for this particular denominational order to be displayed, and likewise transmits the differential positioning of said beam to the printer shaft 105, which positions the type wheel 94 to print the amount set up on the key 46.

The segment 98 has teeth which cooperate with an aliner 106 fast on a shaft 107. The aliner 106 is disengaged from the segment 98 at the beginning of a machine operation and remains disengaged therefrom until said segment is positioned, after which said aliner is reengaged therewith to hold said segment and its associated indicators against displacement.

After the actuator 60 has been positioned under control of the depressed amount key, and the operating segment 73 has reached the terminus of its initial movement clockwise, continued rotation of the cams 79 and 80 returns the lever 75 and the segment 73 counterclockwise until the shoulder 72 on said segment moves beyond the foot-shaped extension of the latch 69, whereupon said latch is immediately spring-urged into engagement with said shoulder and a surface 108 on the segment 73 (Fig. 1), in cooperation with a stud 109 in the actuator 60, returns said actuator in unison with said segment to home position, as here shown, which it will be observed is one step below zero position.

When no amount key 46 is depressed, the zero stop pawl 56 remains in the path of the nose of the reset spider 58, as here shown, and initial movement clockwise of the segment 73 carries the actuator 60 and spider 58 in unison therewith until the nose of the spider engages the rearward extension of the pawl 56, whereupon said spider, by means of the slot therein, in cooperation with the stud 70, causes the bell crank to rock the latch 69 out of engagement with the shoulder 72 to locate the actuator 60 in zero position.

Near the end of an adding operation, a key lock and release shaft 110 (Fig. 1), journaled in the frames 40 and 41, is rocked counterclockwise in the usual manner, which movement by means of a rod 111, extending between similar arms 112 secured on said shaft 110, in cooperation with a foot-shaped extension 113 of the link 54, shifts the plate 52 downwardly a sufficient distance to disengage the stud 51 from the shoulder of the depressed amount key to permit said amount key to be spring-returned to undepressed position, as here shown. After the keys are released, the shaft 110 is immediately returned clockwise to normal position, to permit the studs 51 to move into contact with the edges of the stems of the keys 46.

*Totalizers*

The machine embodying the instant invention has two lines of interspersed totalizers, each line containing ten sets of totalizer wheels, said lines usually being referred to as the upper or #1 totalizer line and the front or #3 totalizer line, and a #2 or balance totalizer which controls the actuation of the ten sets of wheels on each of the ten storage wheel lines.

In adding operations, after the actuator 60 (Fig. 1) has been positioned under control of the depressed amount key and after the segment 73 has completed its initial movement clockwise, the corresponding selected wheel 114 or 115 of the #1 or #3 totalizer, respectively, is engaged with actuator 60, and return movement of said actuator rotates said wheels clockwise to add therein the amount set up on the amount key. After the actuator 60 has completed its return movement counterclockwise, the wheel 114 or 115 is disengaged therefrom. When the wheels 114 or 115 pass through zero position, while traveling in an additive direction, a long tooth thereon in cooperation with the well known transfer mechanism trips the transfer segment of the next highest order so that one will be added thereon.

As previously explained, in total and sub-total operations the main shaft 82 and cams 79 and 80 make two clockwise revolutions. During the first revolution of the shaft 82, the selected totalizer line is shifted laterally to aline the proper set of wheels thereon with the actuators 60, and also during the first cycle the zero stop pawl 56, in cooperation with the spider 58, breaks the latch of the actuator 60 in zero position. Near the end of the first cycle of a total or sub-total operation, a zero stop throwout shaft 516 (Fig. 1) journaled in the frames 40 and 41, is rocked clockwise. Clockwise movement of the shaft 516 causes a rod 518, extending between similar arms 517 (only one here shown) secured on said shaft 516, in cooperation with an arm 519, secured on the shaft 57, to rock said shaft and the zero stop pawl 56 counterclockwise to move the projection on the upper end of said stop pawl out of the path of the nose of the spider 58. Also during the first cycle of a total or sub-total operation, after the selected wheel 114 or 115 has been alined with the actuator 60, said wheel is moved into engagement with said actuator 60. Of course, it is understood that it is impossible to take a sub-total or total of more than one set of wheels at a time.

Initial movement clockwise of the actuator 60, during the second cycle of a total or sub-total operation, reversely rotates the wheel of the selected totalizer until said wheel arrives in zero position, whereupon the long tooth thereon, in cooperation with the well known mechanism later to be explained in connection with the balance totalizer, obstructs further movement of the spider 58. This causes said spider 58 to rock the bell crank 67 to move the latch 69 out of engagement with the shoulder 72 to arrest the actuator 60 in a position proportionate to the amount on the selected totalizer wheel. After the actuator 60 has been thus positioned, the roller 78 positions the beam 88, the indicator segment 93, and the printing wheel 94, in proportion to the position of the actuator 60.

In total operations, immediately after the segment 73 has completed its clockwise movement during the second cycle of such operation, the wheel of the selected totalizer is disengaged from the actuator 60. The wheel is not affected by return movement counterclockwise of said actuator, and therefore remains in a zeroized condition. In sub-total operations, the selected totalizer wheel remains in engagement with the actuator 60 during its return movement counterclockwise and is restored thereby to its original position.

In the instant embodiment, a row of transaction keys 116 (Fig. 23) controls the selection and engaging of certain of totalizers on the #1 totalizer line in adding operations and a split row of transaction keys 117 and 118 controls the selection and engaging of certain of the totalizers on the #3 totalizer line in adding operations. In the present embodiment, only four keys 116 are provided in one bank to select four of the totalizers on the upper line, and seven keys 117, 118 are provided in another bank to select seven of the totalizers on the front line. However, if it were desired to use all ten totalizers on the upper and the front lines, then ten keys could be provided in each of these banks. In total printing operations, these keys control the selection of the individual totalizers on each of their lines. However, the engaging of said totalizers with the actuators is controlled by the usual total control lever 119. The keys 117 and 118 also control the selection of the plus and minus sides of the balance totalizer as will be fully explained later herein.

Balance totalizer

The #2 or balance totalizer (Fig. 1), as previously explained, forms a connecting link between the main actuators 60 and the ten lines of storage wheels. The balance totalizer functions substantially the same as the totalizers on the #1 and #3 totalizer line. All computations of the amounts stored in the various sets of storage wheels are performed in the balance totalizer. For example, in adding and subtracting operations, the selected set of storage wheels is reversely rotated to zero and the amount thereon is transferred to the plus side of the zeroized balance totalizer. The balance totalizer is then disengaged from the auxiliary actuators for the storage devices and engaged with the main actuators 60.

In adding operations the plus side of the balance totalizer is engaged with said main actuators, and the amount set up on the keyboard is added to the amount already on the balance totalizer wheels. In subtract operations the minus side of the balance totalizer is engaged with the actuators 60 and the plus wheels of said balance totalizer are reversely rotated thereby to subtract from the amount therein the amount set up on the keyboard. At the very beginning of the next succeeding operation, the combined amount on the plus side of the balance totalizer is transferred to the wheels of the selected storage device. Thus the balance totalizer provides means for computing all the amounts or totals stored in the various sets of storage wheels. Inasmuch as the balance totalizer includes certain novel features, it will be described in detail.

The balance totalizer comprises ten denominational units. However, as the mechanism is substantially duplicated in each unit, it is believed that a description of the mechanism of the denominational unit associated with the main actuator mechanism shown in Fig. 1 will be sufficient.

The denominational unit of the balance totalizer chosen to be described comprises a plus wheel 120 (Figs. 1, 4, and 20) and a minus wheel 121 free on a rod 122 supported by the end plates 123 and 124 of a shiftable framework, said end plates being connected by a cross bar 125. The framework just described is shiftable laterally to bring the plus or minus wheels of the balance totalizer into register with the main actuators, and is shiftable forwardly and rearwardly to connect the wheels of the balance totalizer with and disconnect said wheels from the auxiliary actuators for the storage devices and the main actuators for the machine proper. The side plates 123 and 124 (Figs. 4, 6, 19 and 20) have similar slots 126 and 127 which engage respectively guide blocks 128 and 129 on extensions of right and left support plates 130 and 131 similar to the plate 62 (Fig. 1) and supported by rods 63 and 64. Slots 132 and 133 (Figs. 6, 19 and 20) in the end plates 123 and 124 are parallel to the slots 126 and 127 and cooperate respectively with rollers 134 and 135, on a rod 141 supported by end plates 136 and 137 (Fig. 4) for the storage devices to assist in shiftably supporting the framework for the balance totalizer. The plates 136 and 137 are supported by a shaft 138 journaled on trunnions in the frames 40 and 41, and by a rod 139 supported by said frames 40 and 41. The plates 136 and 137, together with various other companion plates, rods and shafts, form the framework for the storage device assembly.

The plus wheel 120 of the balance totalizer (Figs. 4, 20 and 21) has integral therewith a gear 145 which meshes with a pinion 146 mounted on a plate 147, said plate being supported by the shaft 122 and having an extension which engages a hole 148 in the base of a bracket 149 secured on the crossbar 125 on the shiftable framework. The pinion 146 meshes with a companion pinion 150 pivoted on a stud 151 in the plate 147 and said pinion 150 in turn meshes with a gear 152 integral with the minus wheel 121 of the balance totalizer. From the foregoing it is evident that the plus and minus wheels of the balance totalizer are geared together for reverse movement. That is, when one wheel is rotated in one direction by the main actuator 60, the other wheel is rotated in the opposite direction.

Figure 18:
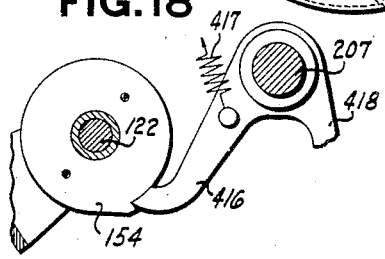
Fig. 18 is a detail view of the stop pawl and stop disc associated therewith, for terminating retrograde movement of one of the totalizer wheels when it arrives at zero position.
Figures 20, 21:
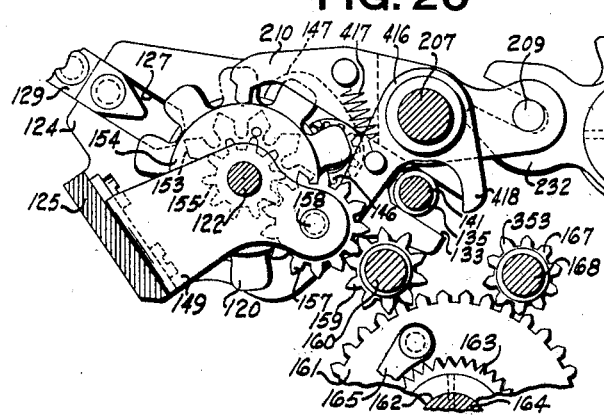
Fig. 20 is a detail view of one denominational order of the balance totalizer and its connection to the corresponding order of the storage devices.
Fig. 21 is a detail view of the gearing for driving the balance totalizer wheels in a reverse direction in subtract operations.

Referring to Figs. 4, 18 and 20, integral with the plus wheel 120 and the gear 145 is an alining gear 153, a zero stop disc 154, an actuator drive gear 155, and a plus transfer cam 156, said parts including the gear 120, being rotatable as a unit upon the shaft 122. Integral with the minus wheel 121 (Figs. 4, 6 and 21) and the gear 152 is a minus transfer cam 144, which, together with the plus transfer cam 156, functions in a manner later to be described to cause tens values to be transferred from the denomination being described to the next higher denomination in adding and subtracting operations, and also functions in sub-total and total operations to position the corresponding main actuator 60 to the positive or true negative balance contained in the balance totalizer. The plus and minus wheel assemblies of the balance totalizer are free on the shaft 122 and are retained between the side plates of the corresponding bracket 149, which bracket prevents lateral displacement thereof and also assists in supporting the shaft 122.

The pinion 155 (Figs. 14 and 20) meshes with a gear 157 pivoted on a stud 158 in an extension of the bracket 149 and said gear 157 in turn meshes with a long pinion 159 free on a rod 160 supported by the plates 136 and 137 (Fig. 3) and the various other plates of the storage device assembly. The teeth of the gear 157 and the pinion 159 are pointed to assist engaging thereof. The long pinion 159 meshes with a corresponding auxiliary actuator 161 (Figs. 3, 14 and 20) free on a bushing 162, which bushing together with a ratchet 163 for driving said auxiliary actuator is secured on a shaft 164 journaled in the storage unit framework. A shoulder on the bushing retains the auxiliary actuator 161 next to the ratchet 163 and enables the auxiliary actuator 161 to be shifted with shaft 164 to select the storage wheels to be actuated. Two similar pawls 165, only one here shown, are mounted on the auxiliary actuator and are urged by springs 166 into engagement with the teeth of the ratchet 163 to form an impositive driving connection between the shaft 164 and the auxiliary actuator 161. In the present adaptation there are ten auxiliary actuators 161, one for each denominational order, and said auxiliary actuators are adapted to actuate the corresponding ones of ten groups of interspersed storage wheels 167, rotatably supported by ten storage lines 168 arranged in a circle around the actuators 161 and shiftably mounted in slots in the plates 136 and 137 and in partition plates 169 and 170, (Figs. 3 and 14) similar to said plates 136 and 137, between which the interspersed storage wheels 167, for the particular denominational order being described, are retained. The ten lines 168 are shiftable radially to engage and disengage the ten groups of storage wheels mounted thereon with and from the auxiliary actuators 161, as will be explained more fully later.

In the ensuing pages all the storage wheels on one line will be referred to as a storage group or a group of storage wheels, each storage group consisting of ten denominational orders of interspersed storage wheels, which will hereinafter be referred to as storage sets or sets of storage wheels.

*Engaging and disengaging mechanism for the balance totalizer*

As brought out in the general description, the balance totalizer is adapted to be engaged with the main actuators 60 to have amounts entered therein under control of the depressed amount keys 46, and is likewise adapted to be engaged with the long pinions 159 (Fig. 20) to transfer the amount entered in said balance totalizer into the desired set of storage wheels 167. The mechanism for engaging and disengaging the balance totalizer will now be described.

The side members 123 and 124 (Figs. 4, 6 and 19) of the balance totalizer framework 125 each has an identical slot 171 and the plates 136 and 137 have corresponding camming slots 172 through which extend studs 173 in identical links 174 pivotally connected at 175 to similar arms 176 secured on a shaft 178 (Fig. 4), said shaft being fulcrumed on trunnions in the frames 40 and 41. Also secured on the shaft 178 is a crank 179 (Figs. 4, 5, and 19) having a stud 180, which extends between similar projections 181 and 182 of a pitman 183, the upper end of which is guided by a slot 184 therein, in cooperation with the shaft 178. The lower end of the pitman 183 (Figs. 4 and 5) carries a stud 185, which extends through an L-shaped arcuate slot 186 in a plate 187, and is adapted to engage a hook 188 of an engaging and disengaging spider 189. The plate 187 and the control spider 189 (Fig. 5) are in axial alinement with the amount differentials 60 (Fig. 1) and form a part of the totalizer controlling mechanism, which is fully disclosed in the Fuller Patent No. 1,242,170, referred to near the beginning of this specification.

*Balance totalizer engaging mechanism*

The keys 117 and 118 (Fig. 23) in addition to selecting totalizers on the upper or #1 totalizer line for addition, and selecting the plus and minus sides of the balance totalizer, also control the positioning of a control disc 195 (Fig. 5) to control the engaging and disengaging of the balance totalizer in adding and subtracting operations, it being recalled that the engaging and disengaging of the balance totalizer are exactly the same in either operation. The periphery of the control disc 195 cooperates with a stud 196 in an arm 197 pivoted on a stud 198 in a crank 199 fulcrumed on a fixed stud 200. The arm 197 has a slot 201 which cooperates with a stud 202 in the pitman 183.

At the beginning of adding or substracting operations, the crank 199 is rocked clockwise in the well known manner to move the stud 196 out of the path of the periphery of the control disc 195, whereupon a spring 203 causes the arm 197 to rock counterclockwise, which causes the slot 201, in cooperation with the stud 202, to rock the pitman 183 clockwise to disengage the stud 185 from the hook 188 and to move said stud in the upward branch of the L-shaped slot 186, to retain said pitman 183 and connected mechanism against displacement. Immediately after the crank 199 has been rocked, the control disc 195 (Fig. 5), under control of the depressed key 117 or 118, is positioned so that a high portion of the periphery thereof is opposite the stud 196, whereupon return movement counterclockwise of the crank 199 causes the stud 196 to engage the high portion of the disc 195, thus forming a fulcrum point which causes the arm 197 to rock clockwise during continued counterclockwise movement of the crank 199. Clockwise movement of the arm 197, by means of the slot 201 therein in cooperation with the stud 202, moves the stud 185 into engagement with the hook 188 and into circumferential alinement with the long branch of the slot 186.

After the main actuator 60 (Figs. 1 and 5) has been positioned under control of the depressed amount key 46, in the manner explained earlier herein, the engaging spider 189 is rocked clockwise, in the well known manner, to shift the pitman 183 forwardly, causing the projection 181 thereof (Fig. 19), in cooperation with the stud 180, to rock the crank 179, shaft 178 and arms 176 clockwise. Clockwise movement of the arms 176 shifts the links 174 downwardly, causing the studs 173, guided by the slots 172, and in cooperation with the slots 171, to shift the balance totalizer frame 125 forwardly to disengage the gear 157 (Fig. 20) from the long pinion 159 and to engage the plus or minus wheel 120 or 121, depending upon the type of operation, with the teeth of the actuator 60. The engaging and disengaging movement of the balance totalizer in adding and subtracting operations is illustrated graphically in space A of the chart Fig. 22.

In adding operations, return movement counterclockwise of the main actuator 60 (Fig. 1) causes said actuator to rotate the plus wheel 120 (Figs. 4 and 20) of the balance totalizer in a clockwise direction to add therein the amount set up on the key 46. In subtract operations, return movement of the actuator 60 rotates the minus wheel 121 of the balance totalizer in a clockwise direction, which, by means of the gearing shown in Fig. 20 and explained earlier herein, reversely rotates the plus wheel 120 to subtract therefrom the amount set up on the key 46. After the actuator 60 has completed its return movement the engaging spider 189 (Figs. 5 and 19) is returned counterclockwise, causing the projection 182 of the pitman 183, in cooperation with the stud 180, to return the shaft 178 counterclockwise to disengage the balance totalizer from the main actuators and to reengage the gear 157 (Fig. 20) with the long pinion 159.

Transfer mechanism

When the plus wheel of the balance totalizer is engaged with the actuator 60 (Figs. 4 and 6), the transfer tripping cam 156 for said wheel is in the position shown by dot and dash lines in Fig. 6. When the plus wheel 120 of the balance totalizer passes from nine to zero, a tripping node on said cam wipes past a projection of a tripping pawl 204 to render the transfer mechanism effective to add one in the next higher order. In subtract operations, when the plus wheel 120 of the balance totalizer passes from zero to nine while being rotated reversely by the minus wheel 121, the tripping cam 144 (Fig. 4) for said minus wheel, in cooperation with the tripping pawl 204, trips the transfer mechanism to cause one to be borrowed from the next higher order.

Further description of the transfer mechanism is believed unnecessary, as this mechanism is well known in the art and is fully disclosed in the patents referred to at the beginning of this specification.

Total and sub-total recording operations

In sub-total and total recording operations, the machine operates through two cycles, the first cycle being utilized to position the selected set of totalizer wheels on the No. 1 or the No. 3 line, in register with the main actuators 60, the zero stops 56 (Fig. 1) for said actuators breaking the latches thereof in zero position during this first cycle of operation. In the case of the No. 2 or balance totalizer, this first cycle of operation is utilized to shift the positive wheels thereof into alinement with the actuators 60 when the balance totalizer is in a positive condition, or to shift the negative wheels of said balance totalizer into alinement with said actuators when said totalizer is in an overdrawn or negative condition.

As stated in the general description, the functions of the machine are controlled by the total control lever 119 (Fig. 23), which normally is in its central or add position. When the total control lever 119 is in add position, the control disc 195 (Fig. 5) controls the engaging and disengaging of the balance totalizer as explained above, and similar discs positioned under control of the keys 116, 117 and 118 control the engaging and disengaging of the #1 and #3 totalizer lines. The total control lever 119 (Fig. 23) is settable to three positions above adding position for controlling reading operations involving the Nos. 1, 2 and 3 totalizer lines, respectively, and to three positions below adding position for controlling resetting operations involving the Nos. 1, 2 and 3 totalizer lines, respectively.

As an example, moving the total control lever 119 to #2 reset position, by means of the well known mechanism, disclosed in the patents referred to hereinbefore, rocks the arm 197 (Fig. 5) clockwise to engage the stud 185 with the hook 188. Near the end of the first cycle of operation, initial movement clockwise of the spider 189 causes the pitman 183 to shift the balance totalizer frame 125 (Figs. 5, 6, and 20) forwardly to engage the plus wheels 120 of the balance totalizer with the actuators 60. At the beginning of the second cycle of operation, initial movement clockwise of the actuator 60 drives the wheel 120 in a counterclockwise or reverse direction and upon its arrival at zero position the projection on the tripping cam 156 wipes an arcuate surface of an arm 206 rotatably mounted on a shaft 207 journaled in the end plates 123 and 124 (Fig. 4) of the totalizer framework. The tripping cam 156 rocks the arm 206 clockwise, against the action of a torsion spring 208 tensioned between a stud in said arm and a rod 209 supported by rearward extensions of totalizer alining pawls 210 in turn secured on the shaft 207. Forward movement of the balance totalizer framework 125 to engage the wheels of the balance totalizer with the actuators 60 moves a flat surface on the upper portion of the arm 206 (Fig. 6) into the path of a foot-shaped extension 211 of a lever 212 pivoted on the plate 131. Clockwise movement of said arm 206 causes the flat surface on the upper portion thereof, in cooperation with the foot 211, to rock the lever 212 counterclockwise. Counterclockwise movement of the lever 212 causes a stud 213 in the upper end thereof, in cooperation with the bifurcated end of a lever 214 pivoted to the plate 131, to rock said lever clockwise against the action of a spring 215. The spring 215 is tensioned between the transfer tripping arm and an actuator stop pawl 216 pivotally mounted on the lever 214, said spring 215 urging said pawl clockwise to normally maintain a bent-over ear 217 thereof in contact with a stud 218 in said lever 214. Clockwise movement of the lever 214 moves the bent-over ear 217 into engagement with a tooth 219 on the spider 58 for this particular amount bank (Figs. 1 and 6), said tooth corresponding to the amount on the balance totalizer wheel, to position the actuator 60 in proportion to said amount. In adding and subtracting operations, the bent-over ear 217 of the pawl 216 is rocked into engagement with the teeth 219, when the node of the add or the subtract transfer cam wipes past the pawl 206. However, when this occurs, the spider 58 is traveling in a counterclockwise direction and consequently the teeth 209 ratchet over the ear 217.

After the amount of the total has been recorded, the engaging spider 189 (Figs. 5 and 6) is returned counterclockwise to disengage the zeroized wheels of the balance totalizer from the actuators 60 and to reengage the gears 157 (Fig. 20) with the long pinions 159.

In sub-total or reading operations, the wheels of the balance totalizer remain in engagement with the actuators 60 (Fig. 1) during their return movement counterclockwise and consequently said wheels are returned to their original positions.

*Overdraft operations*

When the balance totalizer is overdrawn, the true negative balance is obtained by taking a total or a subtotal with the minus totalizer wheels 121 (Fig. 4) in register with the actuators 60.

While the feature is not used in the present adaptation, the machine is arranged for the reading or resetting of the negative side of the balance totalizer in order to obtain a true negative balance. Referring to Figs. 4 and 6, the negative or minus transfer cam 144 cooperates with a pawl 220, similar in outline to the pawl 206, said pawl in turn cooperating with the foot-shaped projection 211 of the lever 212, when the negative side of the balance totalizer is in register with the actuators 60 to position the spiders 58 and the differential mechanisms associated therewith, in proportion to the amount standing on the negative wheels of the balance totalizer.

*Lateral shifting of the balance totalizer*

Mechanism under control of the keys 117 and 118 (Fig. 23) is provided for shifting the balance totalizer laterally to bring the plus or the negative wheels thereof into register with the actuators 60. This mechanism is only partially illustrated herein and will be but briefly described, as it is well known in the art and fully disclosed in the Shipley patents referred to previously.

Figure 2:
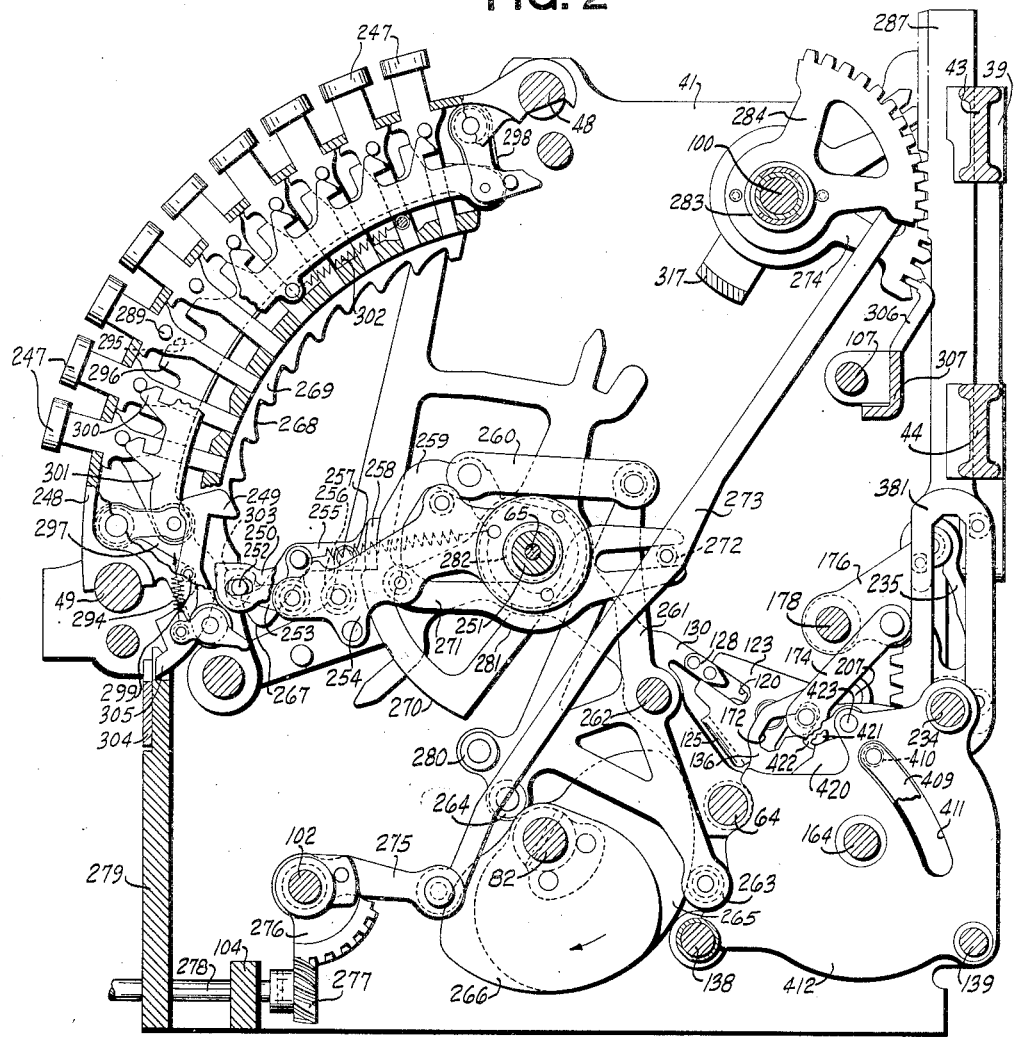
Fig. 2 is a cross-sectional view, as observed from the right of the machine and taken just to the right of one of the transaction banks, illustrating said transaction bank and the differential mechanism associated therewith.

The keys 117 and 118 control the positioning of a transaction differential mechanism, similar to that shown in Fig. 2, said differential mechanism, through the well known beam and associated link 190 (Fig. 3), in turn positioning a corresponding indicator sector 191 and printing sector (not shown) in proportion to the depressed transaction key 117 or 118. The indicator sector 191, for the keys 117 and 118, is connected by a tube 192 to an aliner segment 193 integral with an arm 194. The arm 194 is connected by a link 221 (Figs. 3 and 4) to an arm 222 integral with a balance totalizer shifting cam 223 free on a stud 224 secured in the frame 41. The cam 223 has a groove 225 which cooperates with a roller 226 rotatably mounted on a pin 227 secured in a bracket 228, in turn secured to the end plate 124 of the shiftable totalizer frame 125. An undercut portion of the roller 226 extends through a slot 229 in a bracket 230, fast to the left frame 41, said slot eliminating any tendency of the frame 125 to rock when the cam 223 is being positioned, and likewise serving to retain the roller 226 in the cam groove 225.

The contour of the cam groove 225 (Fig. 4) is such that, when the cam 223 is positioned under control of any one of the plus keys 117 (Fig. 23), the plus wheels 120 of the balance totalizer will be in alinement with the actuators 60, and when said cam 223 is positioned under control of any one of the minus keys 118, the balance totalizer frame 125 will be shifted so as to aline the minus wheels 121 with the actuators 60. As in adding and subtracting operations, the keys 117 and 118 control the selection of the plus or minus side of the balance totalizer in sub-total and total operations. An alining pawl 143 (Fig. 3) fast on the shaft 107, in cooperation with teeth in the segment 193, alines the differential mechanism for the keys 117 and 118 in set position.

Figure 22:
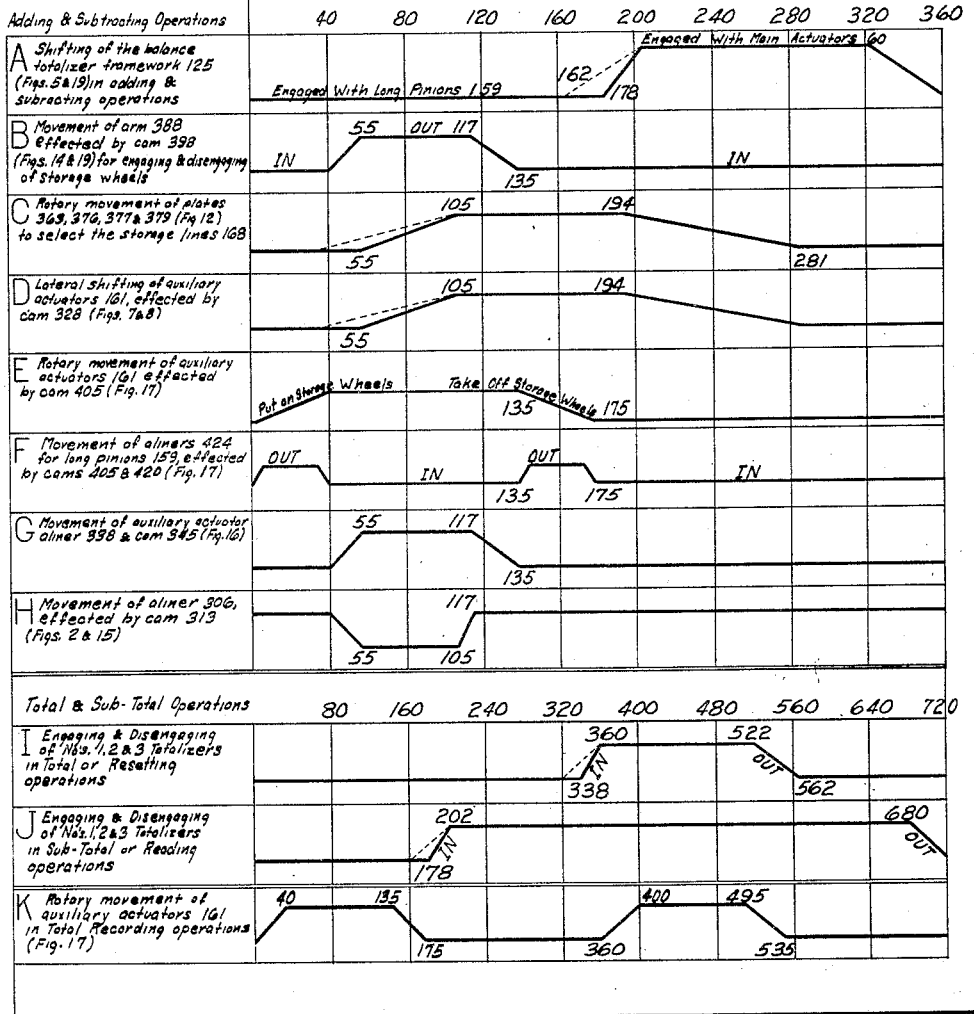
Fig. 22 is a time chart illustrating graphically the timing of the various elements comprising the storage device controlling and operating mechanisms.

The time of the engaging and disengaging of the balance totalizer, during total and sub-total operations, is depicted graphically in spaces I and J of the chart (Fig. 22).

When the wheels of the balance totalizer are moved into engagement with the actuators 60 (Fig. 4), the shifting of the frame 125 causes the pin 227, which shifts in unison therewith, to engage the corresponding one of a series of holes 231 in the bottom of the cam groove 225 to secure the cam 231 and the balance totalizer frame 125 against displacement during the machine operation. The cam 223 is not returned to a neutral or home position at the end of the machine operation, but remains in its set position, and during the succeeding machine operation is moved directly from said set position to its new position.

*Alining mechanism for balance totalizer wheels*

Figure 19:
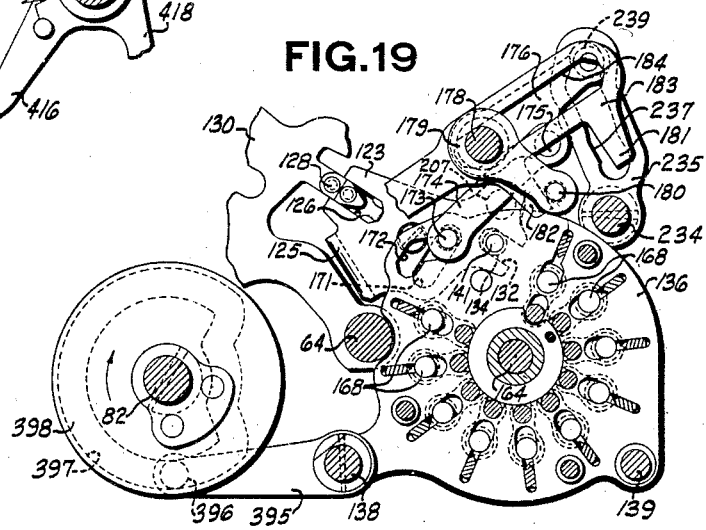
Fig. 19 is a right end view of the storage device mechanism and the balance totalizer, showing mainly the means for controlling the engaging and disengaging movement of the balance totalizer.

As previously explained, the balance totalizer and frame 125 are shown in normal or home position in Fig. 20, in which position the gear 157 is in mesh with the long pinion 159. When the frame 125 is shifted forwardly, to engage the balance totalizer wheel with the actuator 60, the tooth of the aliner 210 engages the teeth of the alining gear 153 to prevent displacement of the balance totalizer wheel while the gear 157 is being disengaged from the pinion 159 and the balance totalizer wheel 120 or 121 is being engaged with the actuator 60, or vice versa. There is an aliner 210 for each denominational order of the balance totalizer and the extreme right-hand and left-hand aliners, and the aliner about midway of these aliners each has a rearward extension which supports the rod 209 (Figs. 4 and 20), and all of said aliners 210 are secured on the shaft 207. The rod 209 is engaged by slots in similar arms 232 and 233 (Figs. 4, 19 and 20) fast on a shaft 234, rotatably supported by trunnions in the frames 40 and 41. Also fast on the shaft 234 are similar arms 235 and 236 having similar camming slots 237 and 238 which cooperate respectively with rollers 239 and 245 carried by the two similar arms 176, which, it will be recalled, are secured on the shaft 178 and move in unison therewith under influence of the pitman 183 (Figs. 5 and 19).

Clockwise movement of the arm 173, shaft 178 and arms 176 under influence of initial movement forwardly of the pitman 183 causes the rollers 239 and 245 (Fig. 4), in cooperation with the cam slots 237 and 238 in the arms 235 and 236, to rock said arms, the shaft 234 and arms 232 and 233 counterclockwise. Clockwise movement of the arms 232 and 233, by means of the slots therein in cooperation with the rod 209, rocks the shaft 207 and the aliners 210 counterclockwise to engage said aliners with the teeth of the alining gears 153, to prevent displacement of the balance totalizer wheels while said wheels are being engaged with the main actuators 60.

When the shaft 178 and the arms 176 approach the terminus of their initial movement clockwise, the configuration of the cam slots 237 and 238 causes the arms 235 and 236, shaft 234, and arms 232 and 233 to return counterclockwise to disengage the aliners 210 from the gears 153, after the balance totalizer wheels have been engaged with the main actuators. Return movement counterclockwise of the shaft 178, under influence of the pitman 183, reverses the procedure outlined above to engage the aliners 210 (Fig. 20) with the gears 153, while the balance totalizer wheels are being disengaged from the main actuators and the gears 157 are being reengaged with the long pinions 159.

Storage device selecting mechanism

The balance totalizer described above is used for computing amounts to be stored in any of 100 storage devices and, as previously explained, these 100 storage devices are mounted on 10 shafts 168 (Fig. 14), there being ten denominational sets of storage wheels on each shaft. Fig. 20 illustrates the mechanical connection between one denominational unit of the balance totalizer and the corresponding auxiliary actuator 161, which actuates the ten sets of storage wheels 167 for this particular denomination. Instead of the storage device lines being shifted laterally with relation to the auxiliary actuators 161, said actuators are shifted laterally in relation to the ten sets of storage wheels actuated thereby.

The lateral shifting of the auxiliary actuators 161 is controlled by a row of keys 246 (Fig. 23), similar to the amount keys 46, and an adjacent row of keys 247 controls the selection of any one of the ten lines of storage devices for engagement and disengagement with said auxiliary actuators 161. The two rows of control keys 246 and 247 each has a differential mechanism somewhat similar to that for the amount bank, illustrated in Fig. 1 and described earlier herein, and as the differential mechanisms for these two control banks are substantially identical, it is believed that the description of the control keys 247 and the differential mechanism therefor will be sufficient.

Selecting keys and the differential mechanism therefor

The keys 247 (Fig. 2) are mounted in a framework 248 supported by the rods 48 and 49, and when no control key 247 is depressed, a zero stop pawl 249, mounted in the frame 248, remains in the path of the nose of a lever 250, rotatable on a bushing 251 supported by the tie rod 65, to break the differential latch mechanism in zero position. The lever 250 has a slot, in the forward end thereof, which surrounds a stud 252 in one arm of a bell crank 253, pivotally mounted on an arm 254 free on the bushing 251. An upwardly extending arm of the bell crank 253 is pivoted to a transaction bank latch 255, and, together with a companion arm 256, supports said latch 255 for parallel shifting movement. This latch mechanism, and in fact, the whole transaction differential mechanism, is similar in many respects to the amount differential mechanism explained earlier herein in connection with Fig. 1.

A spring 257 urges the latch 255 toward a differential operating segment 259 to normally maintain a foot-shaped projection 258 of said latch in the path of a shoulder formed in the periphery of said differential operating segment 259 free on the bushing 251. A link 260 connects the segment 259 to an operating lever 261 free on a stud 262 in a support plate (not shown) but similar to the plate 130. The lever 261 carries rollers 263 and 264, which cooperate respectively with the peripheries of companion plate cams 265 and 266 fast on the main shaft 82, which, it will be recalled, makes one clockwise revolution in adding and subtracting operations and two such revolutions in sub-total and total recording operations.

When no key 247 is depressed in adding or subtracting operations, initial movement clockwise of the shaft 82 and cams 265 and 266 rocks the segment 259 and the lever 250 clockwise until said lever 250 contacts the zero stop 249. This terminates movement of the lever 250 and causes the slot therein, in cooperation with the stud 252, to rock the bell crank 253 counterclockwise to disengage the foot-shaped extension 258 of the latch 255 from the shoulder on the segment 259, thereby effecting what is termed breaking of the transaction differential latch. Breaking the latch 255 (Fig. 2) moves a rounded nose 267 thereof into engagement with the first of a series of alining notches 268 in a plate 269 secured to the frame 248, to hold the differential mechanism against displacement. After the latch 255 has been thus broken or disengaged, the segment 259 continues its clockwise movement uninterruptedly, causing an arcuate surface 270 on the periphery thereof to move into the path of the sole of the foot 258 to lock said latch in the notch 268.

Pivotally mounted on the arm 254 and positioned thereby is a transaction differential beam 271, the rearward end of which is bifurcated to straddle a stud 272 in a link 273. The upper end of the link 273 is connected to an alining sector 274 free on the shaft 100, and the lower end of said link is connected to an arm 275 integral with a gear sector 276 free on the shaft 102. The gear sector 276 meshes with a companion gear 277 secured on one end of a printer shaft 278 journaled in the frame 104 and a printer back frame 279.

When the lever 261 nears the terminus of its initial movement clockwise a roller 280, carried thereby, engages an arcuate surface 281 on the beam 271 and forces said beam upwardly until a curved notch in the upper edge thereof contacts a hub 282 rotatable on the bushing 251. This positions the segment 274 and the shaft 278 in proportion to the position of the lever 250, which in this case is zero position. The segment 274 (Figs. 2 and 3) is connected by a hub 283 to a gear segment 284 and by a tube 285 to a gear segment 286, similar to said segment 284, said gear segments meshing respectively with racks 287 and 288, mounted to slide vertically in slots in the cross bars 43 and 44 of the back frame 39. An extension 381 (Figs. 2, 3 and 10) secured to the rack 287 has a vertical slot therein and the rack 288 has a similar slot both of which are adapted to slide freely on the shaft 234.

Depressing one of the transaction keys 247 causes a stud 289 therein, in cooperation with a corresponding camming surface 295 on a control plate 296, to shift said control plate downwardly against the action of a spring (not shown). The control plate 296 is shiftably mounted in the frame 248 by means of arms 297 and 298, connected respectively to the lower and upper ends thereof, both of said arms pivotally supported by the frame 248. Downward movement of the control plate 296 rocks the arm 297 clockwise, causing a camming surface thereon, in cooperation with a stud 299 in the zero stop 249, to rock said zero stop counterclockwise against the action of a spring 294 to move the upper end thereof out of the path of the nose of the lever 250. Depressing one of the keys 247 likewise causes the stud 289, in cooperation with an angular surface on the upper end of a corresponding hook 300 on a detent 301, to shift said detent downwardly against the action of a spring 302 until said stud moves beyond the hook 300, whereupon the spring 302 returns the detent 301 a slight distance upwardly to latch said hook 300 over the stud 289 and retain the key in depressed position.

Likewise depressing one of the keys 247 moves the lower end of the stem thereof into the path of a rounded surface 303 on the bell crank 253, whereupon initial movement clockwise of the segment 259 and the arm 254 causes the surface 303 to engage the stem of the depressed key to move the latch 255 out of engagement with the shoulder on said segment 259 to control the positioning of the beam 271 in proportion to the depressed key 247. After the beam 271 has been thus positioned, the roller 280, in cooperation with the surface 281, rocks said beam upwardly into engagement with the hub 282 to position the printing mechanism for this particular bank and the racks 287 and 288 (Figs. 2 and 3) in proportion to the depressed transaction key 247. The racks 287 and 288 in turn select one of the ten lines 168 of the storage devices (Fig. 14) for engagement with the auxiliary actuators 161, as will be explained more fully later herein. The movement of the differential mechanism for the keys 247 (Fig. 2) is shown graphically in space C (Fig. 22).

Transaction key interlocks

In adding and subtracting operations it is possible to depress keys in any or all of the four transaction banks. However, in sub-total and total recording operations, the transaction keys are used to select the particular totalizer being read or reset and it is therefore necessary to lock the transaction keys in all banks, except the ones being used, against depression.

In total and sub-total recording operations the keys 246 and 247 (Fig. 23) function in exactly the same manner as in adding and subtracting operations to select the various storage devices for reading or resetting. In order to prevent maloperation of the machine, mechanism under control of the total lever 119 locks all transaction keys against depression, except those corresponding to the position of said total lever. For example, when the total control lever 119 is moved to #2 Read or #2 Reset position, the transaction keys 116, 117, and 118 are locked against depression, while the keys 246 and 247 may be depressed to select the various storage sets. Likewise when the total control lever 119 is in either #1 Read or #1 Reset position, the transaction keys 116, 246 and 247 are locked against depression, and the keys 117 and 118 are free to be depressed to select the various totalizers on the #1 line. This mechanism, which is so well known in the art that little description thereof is believed necessary, includes a slide 304 (Fig. 2) mounted in a recessed portion of the frame 279, said slide having apertures therein adapted to cooperate with a projection 305 of the arm 297. When the total control lever 119 (Fig. 23) is moved either to #2 Read or #2 Reset position, connections between said total control lever and the slide 304 cause said slide to be positioned so that one of the apertures therein is opposite the projection 305. Consequently, clockwise movement of the arm 297 is not obstructed, and it is possible to depress a key in this transaction bank. Obviously similar mechanism for the keys 246 functions at the same time as the mechanism for the keys 247. When the total control lever 205 is moved to either #1 or #3 Read position, or #1 or #3 Reset position, the slide 304 is so positioned that a solid portion thereof is opposite the projection 305, thereby obstructing clockwise movement of the arm 297 to prevent depression of the transaction keys 247. Each transaction bank has arms similar to arm 297, with projections similar to 305 thereon, which projections cooperate with corresponding apertures in the slide 304 in exactly the same manner as described for the keys 247. When the total control lever is in adding position, the slide 304 is so positioned that it does not interfere with depression of any of the transaction keys.

Aliners for transaction differentials

After the segments 274 (Figs. 2 and 3) and the racks 287 and 288 have been positioned under control of the depressed key 247, an alining pawl 306, integral with a yoke alining member 307, is rocked into engagement with a tooth-space of the segment 274 corresponding to the depressed key 247 and remains in engagement therewith until after printing has been effected, to prevent displacement of the associated parts. The timing of the movement of the alining yoke 307 and aliner 306 is illustrated graphically in space H of the chart (Fig. 22). Two bent-over arms of the yoke 307 (Figs. 2, 3, and 15) are free on the shaft 107, and secured to the right-hand arm of said yoke is a crank 308. The crank 308 is pivotally connected by a link 309 to one arm of a lever 310, free on the shaft 138. The other arm of the lever 310 carries a roller 311 which cooperates with a camming groove 312 in a cam 313 secured on the main shaft 82.

When the machine is at rest, the pawl 306 (Fig. 2) engages the segment 274, as here shown. Near the beginning of machine operation and prior to the time that the roller 280 (Fig. 2) engages the beam 271, revolution of the cam 313 (Fig. 15) causes the cam groove 312, in cooperation with the roller 311, to rock the lever 310 clockwise to disengage the pawl 306 from the segment 274, and said pawl remains thus disengaged while said segment is being positioned by the roller 280 in cooperation with the beam 271, as explained above. After the segment 274 has been positioned, continued rotation of the cam 313 causes the cam groove 312 to return the lever 310 counterclockwise to normal position, to reengage the pawl 306 with the tooth-space of the segment 274 corresponding to the depressed key 247. Other alining pawls on the yoke 307 (Fig. 3) similar to the pawl 306, in cooperation with segments for the transaction keys 116 (Fig. 23), 117 and 118, and the transaction keys 246, said segments similar to the segment 274, aline said segments in exactly the same manner as explained in connection with Fig. 2.

Lateral positioning of auxiliary actuators

Inasmuch as the auxiliary actuators 161 (Figs. 3 and 20) are positioned to select one of the ten denominational sets of storage wheels prior to the shifting of the selected one of the ten storage lines to engage said selected set of wheels with said auxiliary actuators, it is believed advisable to discontinue the description of the mechanism associated with the control keys 247 (Fig. 2), which controls the selection of the ten lines of storage devices and the engaging and disengaging movement thereof, and pick up the description of the transaction keys 246 (Fig. 23), which, it will be recalled, control the lateral shifting of the auxiliary actuators 161 in relation to the ten denominational sets of storage wheels.

Figure 3:
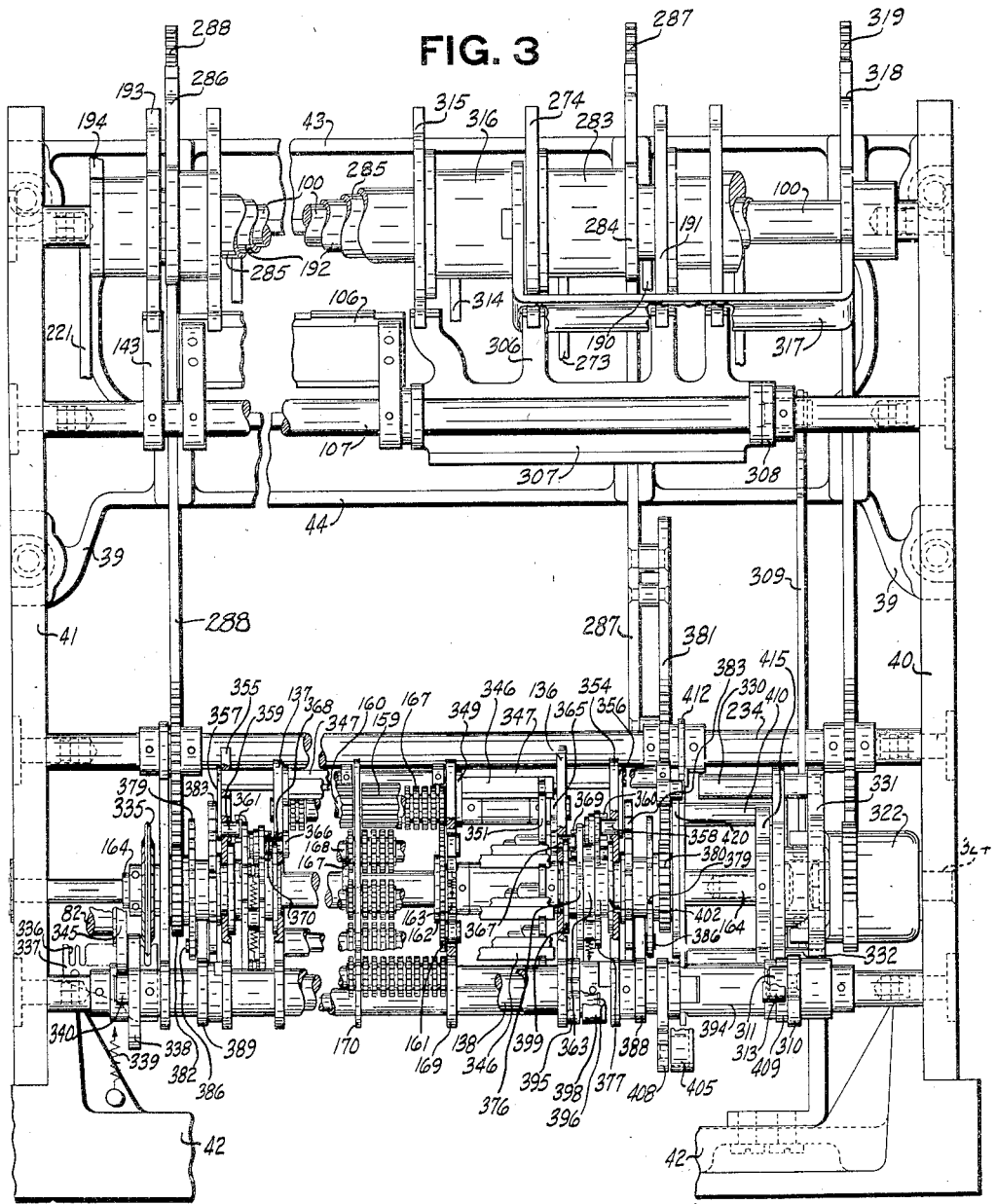
Fig. 3 is a fragmentary front elevation of the machine, showing in particular, one denominational order of the storage devices and the controlling mechanisms associated therewith.

The differential mechanism associated with the keys 246, which is similar in every respect to the differential mechanism for the keys 247 explained above, is connected by a link 314 (Fig. 3), similar to the link 273 for the keys 247, to a segment 315, similar to the segment 274. A collar 316 connects the segment 315 to the left arm of a yoked member 317, the right arm of said yoke forming a segmental gear 318 similar to the segment 284. The segment 318 meshes with the teeth of a vertical rack 319 mounted in slots in the cross bars 43 and 44 in exactly the same manner as the racks 287 and 288 (Fig. 3). The lower end of the rack 319 (Figs. 3 and 8) has a vertical slot 320 which slides on the shaft 234. Teeth in the lower end of the rack 319 mesh with teeth cut in a flanged portion of a shifting sleeve 322 carrying a hub 323 (Figs. 7 and 8), which, in cooperation with a stud 324 secured in the frame 40, rotatably supports said sleeve 322. The head of the stud 324, in cooperation with said hub 323, prevents side-play of the sleeve 322.

Mounted on an extension of the sleeve 322 (Figs. 7, 8 and 9) are diametrically opposed studs 325 which engage respectively camming grooves 326 and 327 in an auxiliary actuator shifting cam 328, which cam has a counterboring which fits freely on the hub 323. A flanged portion of the cam 328 is secured to a plate 329, said plate and said cam being held against rotation by means of a hole in the upper end of said plate, which fits freely on a stud 330 in a bracket 331 secured to the base 42, (Figs. 3, 8 and 9), and by means of a slot in the lower end of said plate 329, in cooperation with a stud 332 in said bracket 331. A reduced portion of the counterbore in the cam 328 forms a journal for a trunnion stud 333 secured in a hole in the right-hand end of the shaft 164, the wall formed by said counterbore, in cooperation with the end of the shaft 164 and the head of the stud 333, functioning to prevent lateral movement of the shaft 164 in relation to the cam 328. The left end of the shaft 164 is journaled in a hole in the frame 41.

Depressing one of the keys 246 (Fig. 23) causes the differential mechanism therefor, similar to that shown in Fig. 2, to position the segment 315, (Fig. 3) which, by means of the collar 316 and yoke 317, positions the rack 319 in proportion to the depressed key 246. The rack 319 (Figs. 7 and 8) in turn rotates the sleeve 322 to a position corresponding to the depressed key 246 and said sleeve, by means of the studs 325 therein, in cooperation with the cam grooves 326 and 327, shifts the cam 328, the shaft 164 (Figs. 3 and 20) and the auxiliary actuators 161 laterally to a position corresponding to said depressed key 246. The lateral selecting movement of the auxiliary actuators 161 is illustrated graphically in space D of the chart (Fig. 22).

After the auxiliary actuators 161 have been thus positioned, the selected storage wheel line 168 (Fig. 14) is shifted to engage the selected set of storage wheels on that line with said auxiliary actuators. After the storage wheels are engaged with the auxiliary actuators, mechanism presently to be described rotates the shaft 164 to enter the amount set up on the amount keys 46 in said storage wheels. As is customary with this type of differential mechanism, the lateral positioning of the auxiliary actuators 161 is not disturbed during the remainder of the machine operation, but at the beginning of the next machine operation said actuators are moved directly from their old position to their new position.

Aliner for auxiliary actuators

The shaft 164 has secured thereto an alining disc 335, (Figs. 3 and 16) adapted to cooperate with a series of notches 336 in an aliner plate 337 secured to a bent-over portion of a lever 338. The lever 338 is free on the shaft 138 and a spring 339 urges said lever clockwise to normally maintain a roller 340 carried thereby, in contact with the periphery of a plate cam 345 secured on the shaft 82. The timing of the cam 345 is depicted graphically in space G of the time chart (Fig. 22). When the machine is at rest, the aliner 337 (Fig. 16) engages the disc 335, but soon after the beginning of the machine operation and prior to the time that the auxiliary actuators 161 are shifted laterally, the cam 345, in cooperation with the roller 340, permits the springs 339 to rock the lever 338 counterclockwise to disengage the aliner 337 from the disc 335. After the shaft 164 and the auxiliary actuators have been positioned laterally, as explained above, to select the desired set of storage wheels, the cam 345 rocks the lever 338 counterclockwise to engage the notch 336 of the aliner 337, in register with the disc 335 (Fig. 3), with said disc to prevent lateral displacement of the auxiliary actuators during the remainder of the machine operation.

Storage wheel engaging mechanism

Figure 23:
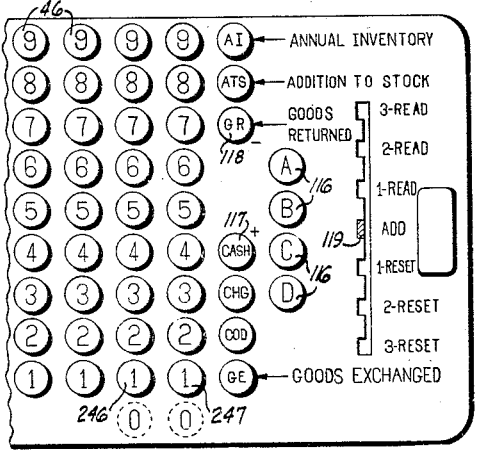
Fig. 23 is a diagrammatic view of a portion of the keyboard of the machine embodying the instant invention.

As previously explained, each of the ten storage wheel shafts 168 (Fig. 14) supports ten denominational sets of storage wheels 167, said shaft being shiftably mounted in slots in the plates 136, 137, 169 and 170 (Fig. 3). The storage wheel shafts 168 are adapted to be shifted radially, in relation to the shaft 164, to engage and disengage the selected set of storage wheels thereon with and from the auxiliary actuators 161. The selection of the ten storage lines 168 for engagement with and disengagement from the auxiliary actuators 161 is controlled by the transaction keys 247 (Figs. 2 and 23). The set of storage wheels selected in the preceding operation remain in engagement with actuators 161, as illustrated by the #10 storage line 168 located near the top of the plate 169 to the right of shaft 160 (Fig. 14), during the early part of the succeeding operation until the amount on the balance totalizer wheels is entered therein, which is effected by said balance totalizer wheels being reversely rotated to zero position by the auxiliary actuators 161. Immediately after the entry of amounts therein, the pre-selected set of storage wheels are disengaged from the actuators 161 and the set of storage wheels selected in the present operation are engaged therewith, as will now be explained in detail.

Stop bar and aliner mechanism

Referring to Figs. 3 and 14, each set of storage wheels 167 has cooperating with the teeth thereof a stop bar 346 and an aliner 347 mounted adjacent to each other in apertures 348 in the plates 169 and 170 and in addition, said stop bars 346 are slidably supported by notches in a series of hook shaped members 349 (Fig. 13) secured on the shaft 168. The stop bars 346 have notches in the right-hand ends thereof which are engaged by one wall of slots 350 (Fig.

14) in a shifting plate 351 loosely mounted on the shaft 164 between the driving ratchet 163 (Fig. 3) for the first denominational order of storage wheels and a collar on the shaft 164 so that said plate 351 and the stop bars 346 will shift laterally in unison with said shaft 164 and the auxiliary actuators 161.

Each storage wheel 167 has ten teeth, corresponding to the ten digits, the zero tooth 353 being longer than the others so that said wheels can not rotate beyond zero position. The stop bars 346 are always in engagement with the teeth of the wheels 167 but each bar has ten equally spaced notches 352 (Fig. 14) therein corresponding to the ten denominational sets of wheels 167 on each line 168, and through which the short teeth of the wheels 167 may freely pass. When the shaft 164 and the auxiliary actuators 161 are shifted laterally under influence of the control keys 246 (Fig. 23), the plate 351 shifts the stop bars 346 in unison therewith to aline the notches 352 therein with the selected sets of wheels 167 so that these wheels will be free to revolve, all other storage wheels being locked against movement by said bars 346.

The aliners 347 engage the teeth of the storage wheels 167 when said wheels are in disengaged position and said aliners likewise travel downwardly in unison with the shafts 168 and the storage wheels 167, to prevent displacement of said wheels while they are being engaged with the auxiliary actuators 161. After the storage wheels are engaged with the auxiliary actuators the aliners 347 are moved out of engagement with the teeth of said wheels so that they may be rotated by the auxiliary actuators 161.

Opposite ends of the aliner 347 (Figs. 3, 10, 12 and 14) fit snugly in radial slots in companion end plates 354 and 355 for the storage device assembly, said plates being mounted on the shaft 138 and rod 139. Opposite ends of the aliners 347 have secured thereto arms 356 and 357, said arms being adjacent their respective end plates 354 and 355 and carrying respectively studs 358 and 359 which extend inwardly through radial slots in the plates 354 and 355. The studs 358 and 359 are arranged to cooperate respectively with parallel fingers on shifting arms 360 and 361, said arm 360 being pivoted on a stud 362 in a plate 363 fastened to a hub 364 free on the shaft 164. Arms similar to the arms 360 and 361 (Figs. 3 and 12) and operated by the same mechanism are arranged to shift any selected one of the ten lines of storage devices into and out of engagement with the auxiliary actuators 161.

Each of the storage lines or shafts 168 (Figs. 3, 12 and 13) has secured on opposite ends thereof arms 365 and 366 carrying respectively studs 367 and 368 adapted to cooperate with parallel fingers on engaging arms 369 and 370. The arm 369 (Fig. 13) is pivoted at 371 to the plate 363 in such a manner that the parallel fingers thereof are facing the parallel fingers of the arm 370 and in radial alinement therewith. The arms 360 and 369 carry respectively studs 372 and 373 cooperating respectively with camming slots 374 and 375 in plates 376 and 377 secured in fixed relation to each other and straddling the plate 363, said plate 377 carrying a hub 378 rotatably mounted on the hub 364.

Clutch tenons on the hub 364 (Figs. 3, 11 and 12) engage clutch cuts in a hub 390 integral with a locking plate 379 and a gear 380, said hub being free on the shaft 164. The gear 380 (Fig. 3) meshes with teeth in the extension 381 of the rack 287, which rack, it will be recalled, is operatively connected to the rack 283, both of said racks being positioned under control of the transaction keys 247 in the manner explained earlier herein. Teeth in the lower end of the rack 288 mesh with a gear 382, which is connected to the arms 361 and 370 for the left end of the aliner 347 and the storage wheel lines 168, in exactly the same manner as the gear 380 is connected to the right-hand arms 360 and 369. Clutch tenons on the hub 378 (Figs. 10, 11 and 12) engage corresponding clutch cuts in a hub fastened to a storage line engaging plate 383 rotatably mounted on the outside diameter of the hub 364. A spacer ring 1390 maintains plates 379 and 383 in proper side spacing. It is to be understood that there is a left-hand unit comprising plates similar to the plates 379 and 383 and associated mechanisms of the right-hand unit which works in conjunction with said right-hand unit to control the movement of the storage wheel aliners and the engaging and disengaging of the storage wheels.

Each of the plates 379 and 383 (Fig. 10) has ten notches 384 and 385, corresponding to the ten lines of storage wheels, said notches adapted to be engaged respectively by studs 386 and 387 in an arm 388 secured on the shaft 138. An arm 389 (Fig. 3) secured on the shaft 138 and similar to the arm 388 has studs which cooperate with slots in the left-hand locking and engaging plates in exactly the same manner as the arm 388. Also secured on the shaft 138 (Figs. 3 and 19) is an arm 395 carrying a roller 396 which cooperates with a cam groove 397 in a cam 398 secured on the shaft 82.

As illustrated in Fig. 14, one of the sets of storage wheels on the No. 10 line is in engagement with the actuators 161, said wheels having been selected during the preceding operation and consequently remaining in engagement with said actuators at the end of said operation. At the beginning of the next succeeding operation the amount contained in the balance totalizer is entered in the storage wheels 167 and immediately thereafter the cam 398 (Fig. 19), the timing of which is shown in space B of the chart (Fig. 22), rocks the arm 395, the shaft 138 and the arms 388 and 389 (Figs. 3 and 10) clockwise. The notches 384 are concentric with the shaft 138 and the notches 385 are eccentric to said shaft, consequently clockwise movement of the arms 388 and 389 causes the studs 387 to rock the engaging plates 383 clockwise, while the studs 386 hold the locking plates 379 stationary.

Clockwise movement of the plate 383 (Fig. 10), effected by eccentricity of the notches 385 therein in relation to the stud 387, causes the plates 376 and 377 (Figs. 11 and 12) to be rocked clockwise in unison therewith. Clockwise movement of said plates causes the cam slot 375, in cooperation with the stud 373, to rock the arm 369 clockwise and as the horizontal fingers of said arm embrace, at this time, the stud 367 (Fig. 13) of the No. 10 storage device, clockwise movement of said arm 369 shifts the shaft 168 upwardly (see also Fig. 14) to disengage the selected set of wheels 167 of the No. 10 storage device from the auxiliary actuators 161. Clockwise movement of the plate 376 (Fig. 10) causes the cam slot 374, in cooperation with the stud 372, to rock the arm 360 first clockwise and then counterclockwise to shift the aliner 347 first downwardly into engagement with the teeth of the storage wheels 167 (Figs. 12, 13 and 14) and then upwardly in unison with said wheels as they are disengaged from the auxiliary actuators, and to cause said aliner to remain in engagement with said wheels while they are in disengaged position.

After the storage wheels have been disengaged from the auxiliary actuators, the mechanism controlled by the keys 246 (Figs. 3, 8, 23 and space D of Fig. 22) and explained earlier herein, shifts the shaft 164 and the auxiliary actuators 161 laterally to aline said actuators with the sets of storage wheels corresponding to the depressed key 246. Simultaneously with the lateral shifting of the auxiliary actuators (compare spaces C and D Fig. 22), the mechanism controlled by the keys 247 (Figs. 2, 3, 10, 11, 12 and 23) rotates the assembly including the plates 379, 363, 376 and 377 to a position where the fingers on the arms 360 and 369 straddle the studs 358 and 367 (Fig. 13) for the line 168 of storage wheels corresponding to the depressed key 247. Immediately thereafter the arms 388 and 389 are rocked counterclockwise by the cam 398 (Figs. 10 and 19, and space B Fig. 22) to cause the stud 386 (Fig. 10) to engage the notch 384 corresponding to the depressed key 247, to lock the plate 379 against movement, and to cause the stud 387 to simultaneously engage the camming notch 385 corresponding to the depressed key 247, to rock the plate 383 counterclockwise while the plate 379 remains stationary. Counterclockwise movement of the plate 383 moves the plates 376 and 377 (Figs. 11 and 12) in unison therewith causing the cam slot 375, in cooperation with the stud 373, to shift the selected shaft 168 downwardly to engage the selected set of storage wheels 167 thereon (Fig. 14) with the auxiliary actuators 161. Simultaneously the slot 374 in cooperation with the stud 372 rocks the arm 360 first clockwise to shift the aliner 347 downwardly in unison with the storage wheels and then to return said arm 360 counterclockwise to move said aliner out of engagement with the storage wheels 167 in order that said wheels may be actuated by the auxiliary actuators 161.

Downward engaging movement of the storage line 168 (Figs. 3, 11 and 13) causes the stud 367 to engage a notch in a locking disc 399 free on a hub 400 integral with the plate 376, said locking disc being secured in fixed relation to the plate 363 by a stud 401. Engagement of the stud 367 with the notch in the locking disc 399 locks the plate 363 and mechanism connected thereto against movement. The periphery of said locking disc 399, in cooperation with all the studs 376 for the storage shafts not selected for engagement, retains said shafts in disengaged position.

A disc 402 (Figs. 3, 11, and 12), similar to the disc 399, free on the hub for the plate 383 and connected to the plate 363 by a stud 403, has a notch 404 therein adapted to be engaged by the stud 353 when said stud and the storage wheel aliner associated therewith are moved downwardly by the arm 360 as explained above. This locks the plate 363 and connected mechanism against displacement, while the storage wheels are being engaged with the auxiliary actuators, and the periphery of the disc 402, in cooperation with the studs 358 for the aliners for all the storage wheel lines not being engaged at this time, retains said aliners against accidental displacement. From the foregoing description it is obvious that the notches in the discs 399 and 402 (Figs. 12 and 13) are positioned by the plate 363 in proportion to the depressed key 247 (Fig. 2) and permit only the storage wheel line and its associated aliner selected by said depressed key 247 to receive engaging and disengaging movements.

It will be recalled by referring to Fig. 20 that at the time the selected set of storage wheels are engaged with the auxiliary actuators, the gears 157 are in mesh with the long pinions 159, said long pinions being constantly in mesh with the auxiliary actuators 161. The shifting movement of the balance totalizer is controlled by the mechanism shown in Figs. 5 and 19 and this shifting movement is depicted graphically in space A of the chart (Fig. 22). While the balance totalizer remains in engagement with the long pinions, the auxiliary actuators 161 (Fig. 20) under influence of their operating mechanism, reversely rotate the wheels 167 of the selected storage device to zero and through the train of gears here shown and explained earlier herein the amount is simultaneously transferred to the positive wheels of the balance totalizer.

*Operating mechanism for auxiliary actuators*

Movement is imparted to the auxiliary actuators 161 by a cam 405 (Figs. 3 and 17) fast on the shaft 82 and having a camming groove 406 therein into which extends a roller 407 mounted on an arm 408 free on the shaft 138. A sleeve 394, free on the shaft 138, connects the arm 408 to a companion arm 409 carrying a stud 410 which extends through a clearance slot 411 in a partition plate 412 supported by the shafts 138, 139 and 234, said slot 411 being concentric with the shaft 138 (Figs. 2, 3, 9 and 17). The stud 410 extends between fingers 413 and 414 on an arm 415 secured on the shaft 164.

As previously explained, the shaft 82 and the cam 405 make a clockwise revolution during adding and subtracting operations, and during the initial part of said revolution, the cam groove 406, in cooperation with the roller 407, rocks the arms 408 and 409 clockwise (space E Fig. 22). Clockwise movement of the arm 409 causes the stud 410 to engage with the finger 413 to rock the arm 415 and the shaft 164 clockwise in unison therewith. Clockwise movement of the shaft 164 (Figs. 14 and 20) by means of the ratchets 163 secured thereon, in cooperation with the pawls 165, carries the auxiliary actuators 161 clockwise in unison therewith, which movement, as will be later explained, takes the amount off of the balance totalizer and enters it in the set of storage wheels selected during the previous operation.

The movement of the cam 405 and mechanism actuated thereby is depicted graphically in space E of the chart (Fig. 22) and by studying the chart and the contour of the camming groove 406 it will be seen that after the auxiliary actuators have received their initial movement clockwise, said actuators dwell in this moved position.

Figure 17:
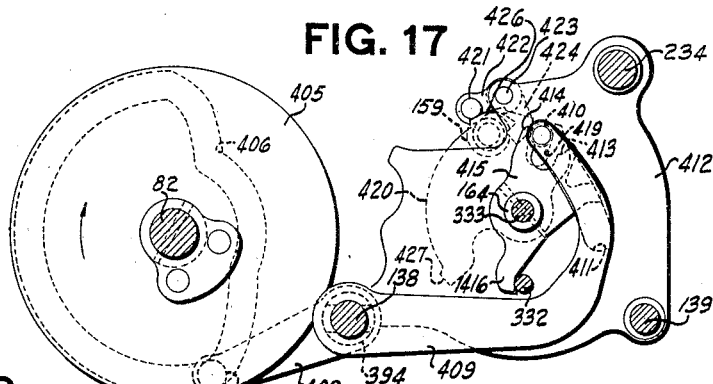
Fig. 17 is a detail view of the cam and associated mechanism for driving the actuators for the storage devices.

By referring to the space A of the chart (Fig. 22), it will be seen that the gears 157 remain in engagement with the long pinions 159 after the balance totalizer is zeroized, and continued rotation of the cam 405 returns the arms 408 and 409 and the shaft 164 counterclockwise, which movement is imparted by the ratchets 163 to their corresponding auxiliary actuators 161 (Figs. 17 and 20). Return movement of the auxiliary actuators 161 reversely rotates the set of storage wheels 167 selected during the present operation to zero, which position is determined by the long teeth 353 thereon contacting the stop bar 346 (Fig. 14) for that storage line. Obviously the non-positive connection formed by the pawls 165 and the ratchet 163 permits the auxiliary actuators 161 to cease moving when the long teeth of the storage wheels 167 contact the stop bar while the ratchets 163 and the shaft 164 complete their return movements under influence of the mechanism shown in Fig. 17. Inasmuch as the gears 157 are in engagement with the long pinions 159, the amount on the selected set of storage wheels is transferred, by the auxiliary actuators 161, to the wheels of the balance totalizer, which prior to such transferring were in a zeroized condition. Home or neutral position of the arm 415 and the shaft 164 is determined by a projection 416 on said arm contacting the stud 332.

Immediately after the auxiliary actuators have completed their return movement counterclockwise, the mechanism illustrated in Fig. 19 and space A (Fig. 22) and explained earlier herein functions to shift the totalizer frame work 125 forwardly to disengage the gears 157 (Fig. 20) from the long pinions 159 and to move the plus or minus wheels (120 or 121) of the balance totalizer, depending upon the type of operation being performed, into engagement with the main actuators 60 (Fig. 1). The amount set up on the keyboard is then added to or subtracted from the balance totalizer, depending upon the type of operation, as explained near the beginning of this specification, after which the mechanism shown in Fig. 19 functions to disengage the wheels of the balance totalizer from the main actuators and to re-engage the gears 157 with the long pinions 159 and they remain thus engaged at the end of the machine operation. It will be recalled that the wheels 167 of the selected storage device also remain in engagement with the auxiliary actuators, at the end of the machine operation.

At the beginning of the succeeding operation, irrespective of whether it is an adding, subtracting, total or sub-total operation, initial movement clockwise of the auxiliary actuators 161, under influence of the mechanism illustrated in Fig. 17, reversely rotates the plus wheels 120 of the balance totalizer until such movement is terminated by the teeth on the stop discs 154 (Figs. 18 and 20) contacting their corresponding stop pawls 416. The stop pawls 416 are free on the shaft 207 and are urged clockwise into contact with the periphery of the discs 154 by springs 417. This stops the wheels of the balance totalizer at zero and, as the auxiliary actuators 161 are in engagement with the selected set of storage wheels, it is therefore obvious that the amount on said balance totalizer wheels is transferred to said storage wheels.

When the totalizer frame work 125 (Figs. 18 and 20) is shifted forwardly to engage the balance totalizer wheels with the main actuators 60, projections 418 on the stop pawls 416 engage the stationary rod 141 and rock said stop pawls counterclockwise out of the path of the zero stop teeth on the discs 154, so that said wheels are free to revolve. It will be recalled that each denominational unit of the balance totalizer includes one of the stop discs 154 and each of said stop discs has its corresponding stop pawl 416.

*Aliners for long pinions*

The cam 405 (Fig. 17) also actuates mechanism which, in cooperation with the teeth of the long pinions 159, holds said pinions and the auxiliary actuators 161 against displacement at all times except when cam 405 is driving the shaft 164 to operate the auxiliary actuators 161. Initial movement clockwise of the arm 409, under influence of the cam 405 (Fig. 17), causes the stud 418 in cooperation with a slot 419 in an alining cam 420, free on the shaft 164, to rock said alining cam clockwise in unison therewith. The periphery of the cam 420 cooperates with a roller 421 carried by a crank 422 secured on a shaft 423 journaled in the plate 412 and the various other plates of the storage device assembly. Secured on the shaft 423 (Figs. 14 and 17) is an alining pawl 424 for each of the long pinions 159, said pawls being urged counterclockwise, out of engagement with the teeth of the long pinions 159, by torsion springs 425.

When the machine is at rest the cam 420 is in the position shown in Fig. 17, in which a high portion 426 of the periphery thereof, in cooperation with the roller 421, retains the aliners 424 in engagement with the teeth of the long pinions 159. Clockwise movement of the cam 420 moves the high portion 426 thereof beyond the roller 421 to permit the torsion springs 425 (Figs. 14 and 17) to rock said pawls counterclockwise out of engagement with the long pinions 159. Near the end of initial movement clockwise of the cam 420 another high portion 427 on the periphery thereof, engages the roller 421 to rock the aliners clockwise into engagement with the long pinions 159. Return movement counterclockwise of the cam 420 reverses the movement outlined above.

The engaging and disengaging of the aliners 424 is illlustrated graphically in space F of the chart (Fig. 22) and by comparison with space E it will be seen that the aliners are out of engagement with the long pinions during the time that the auxiliary actuators are making their oscilating movement under influence of the cam 405 (Fig. 17) to actuate the selected storage wheels.

*Total and sub-total recording operations*

The engaging and disengaging movement of the balance totalizer in total recording or reset operations is illustrated graphically in space "I" of the chart (Fig. 22), and the actuating movement of the auxiliary actuators 161 is depicted graphically in spcae K. From the above it will be seen that, during the first cycle of a total recording operation, the amount on the balance totalizer, from the preceding operation, is entered in the set of storage wheels selected during said preceding operation, after which said preselected storage wheels are disengaged from the auxiliary actuators and the set of storage wheels from which it is desired to take a total are engaged therewith, and the amount thereon is entered in the previously zeroized balance totalizer wheels. Near the end of the first cycle of a total recording operation, the wheels of the balance totalizer are disconnected from the auxiliary actuators and engaged with the main actuators 60.

In the first part of the second cycle of a total recording operation, the positive wheels of the balance totalizer are reversely rotated to zero position and the main actuators are positioned in proportion thereto in the usual manner. After the amount has been recorded, the wheels of the balance totalizer are disengaged from the main actuators and are again engaged with the auxiliary actuators, and as this occurs prior to return movement of the main actuators, the wheels of the balance totalizer remain in a zeroized condition. Inasmuch as the wheels of the balance totalizer are standing at zero, nothing will be entered in the selected set of storage wheels during the first part of the next succeeding operation. Consequently, said storage wheels remain at zero.

The engaging and disengaging movement of the balance totalizer in sub-total recording or reading operations is depicted graphically in space J of the chart (Fig. 22) and it will be observed that in sub-total operations the balance totalizer is disconnected from the auxiliary actuators and engaged with the main actuators earlier during the first cycle than in total operations. However, this is of no vital importance, and its occurrence is due chiefly to the structure of the engaging mechanism. Also it will be observed that the wheels of the balance totalizer remain in engagement with the main actuators 60 during the return movement of the actuators 60 and are consequently restored thereby to their original positions. Near the end of the second cycle of said sub-total recording operation, said balance totalizer wheels are disengaged from the main actuators and reconnected to the auxiliary actuators. Obviously, as the amount has been reentered in the wheels of the balance totalizer, this amount will be reentered in the selected set of storage wheels during the first part of the next succeeding operation, regardless of whether it is an add, subtract, sub-total recording, or total operation recording.

Summarizing briefly, the above specification discloses a machine having 100 sets of storage wheels arranged in a compact unit and adapted to be controlled by a balance totalizer, in which all computations of amounts to be entered in the 100 storage sets takes place. This computation of amounts includes adding, subtracting, total recording and sub-total recording operations, and the transferring of both positive and negative amounts from lower to higher denominations. With the storage devices and their associated balance totalizer as disclosed in the above specification, 100 separate totals may be maintained and taken with the two interspersed totalizers of the regular machine provide altogether 120 totals, and comprise a machine ideal for use in various business systems.

Mode of operation

It is believed that the above specification will give a thorough understanding of the functioning of the machine embodying the instant invention. However, a brief outline will be given of several business systems in which such a machine may be used to advantage.

The present machine is ideally adapted to a system of perpetual cash, item or department inventory for large merchandising establishments. At the beginning of a business period, for example, the beginning of a fiscal year, the value of the complete inventory of each of 100 departments is entered in the corresponding ones of the 100 storage devices. During the ensuing year, each time a sale is made in any of the 100 departments, the amount of each sale is subtracted from the annual inventory stored in the respective storage devices and by comparing the present total on any storage device with the original amount of the inventory, an immediate check of the state of the inventory in any department may be obtained.

In addition to keeping a check on the cash value of the inventory, a similar system may be utilized in analyzing the value of the sales for 100 departments of large merchandising establishments over a certain period of time. In this case, each of the 100 departments has a set of storage wheels in which the amount of the sales over a certain period of time will be stored. In such a system the sales would undoubtedly be net sales, taking into consideration all goods returned or exchanged. As all transactions and the data pertaining thereto, such as department, clerk, type of transaction, etc., are recorded upon the audit strip, consulting this audit strip will immediately give a complete analysis of the value of the sales in each of the 100 departments.

Another use of the present machine is that of a combined cash and inventory system in which 50 of the storage devices are used for item inventory and 50 of said storage devices for cash inventory of the corresponding items. Such a system will give immediate information on the condition of the inventory from both an item and an amount standpoint.

There are many business systems in which a machine such as this may be advantageously employed. For example, a large electrical company manufacturing and marketing electrical appliances may obtain a complete sales analysis of 100 leading electrical appliances manufactured and marketed thereby, or a large packing company may keep a complete sales analysis of 100 different meats marketed thereby.

There are numerous other ways in which such a machine as this may be used to advantage. However, it is believed that the brief outlines of the several systems above will give a good idea of the flexibility of this machine and its adaptability to present day business systems.

While the form of mechanism herein shown and described is admirably adapted to fulfil the objects primarily stated, it is to be understood that it is not intended to confine the invention to the one form or embodiment herein disclosed, for it is susceptible of embodiment in various forms, all coming within the scope of the claims which follow:

What is claimed is:

1. In a machine of the class described, the combination of a plurality of lines of storage elements, each line having a plurality of sets of denominational storage elements thereon; a balance totalizer to compute amounts to be entered in the storage elements; actuators intermediate the balance totalizer and the storage elements on the various lines; key-controlled means to position the actuators in relation to the different sets of storage elements; means to connect the actuators with the balance totalizer in any shifted position of the actuators; key-controlled members movable in relation to the storage lines to select any one of said lines for engaging and disengaging movement; engaging arms on the members movable in unison therewith into operative relationship with the selected storage line; means to move the engaging arms independently of the members to impart engaging movement to the selected storage line to engage the selected set of storage elements with the actuators; and means to yieldably drive the actuators in one of two directions to transfer amounts from said storage elements to the balance totalizer and in the other of said two directions to transfer amounts from said balance totalizer to the storage elements.

2. In a machine of the class described, the combination of a plurality of storage lines, each of said lines supporting a plurality of sets of denominational storage elements; a balance totalizer to compute amounts to be entered in the storage elements; actuators intermediate the balance totalizer and the storage elements; means to operate the actuators to transfer amounts from said storage elements to the balance totalizer and vice versa; key-controlled means to position the actuators in relation to similar elements in each of said sets of storage elements on said storage lines; means to connect the balance totalizer with the actuator in any position thereof; key-controlled members movable in relation to the storage lines to select any one of said lines for engaging and disengaging movement; engaging arms on the members movable in unison therewith into operative relationship with the selected storage line; and means, including cam members cooperating with the arms, and means to drive the cam members, to move the arms independently of the key-controlled members to engage the selected set of storage elements with the actuators.

3. In a machine of the character described, the combination of a plurality of storage lines, each of which supports a plurality of denominational sets of storage elements; a balance totalizer to compute amounts to be entered in the storage elements; actuators intermediate the balance totalizer and the storage elements on all the storage lines; key-controlled means to position the actuators opposite similar elements in different sets of storage elements on the plurality of lines; long pinions meshing each with a related actuator in any position thereof and connecting the actuators to the balance totalizer; selecting members; arms mounted on the selecting members, said arms adapted to impart engaging and disengaging movement to the selected storage line; key-controlled means to move the members in relation to the storage lines to operatively connect the arms to the selected storage line; cam plates connected to the arms and movable in unison with the members during selecting movement thereof; means to move the cam plates relatively to the members to cause the arms to impart engaging and disengaging movement to the selected storage line to engage and disengage the selected set of storage elements with and from the actuators; and means to drive the actuators in one direction to transfer amounts from the storage elements to the balance totalizer and to drive the actuators in the opposite direction to transfer amounts from said balance totalizer to the selected storage elements.

4. In a machine of the class described, the combination of a balance totalizer; a plurality of shiftable storage lines each supporting a plurality of sets of storage elements; means to connect the balance totalizer to the different sets of storage elements on said storage lines; means to drive the connecting means in one direction to transfer any amount on said balance totalizer from said balance totalizer to a selected set of said storage elements and in the opposite direction to transfer any amount on a selected set of storage elements from said selected set of storage elements to said balance totalizer; means to position the connecting means in relation to the storage elements to select the desired set of elements for actuation; means to control the engaging and disengaging of the balance totalizer with and from the connecting means; and means comprising positionable members carrying engaging arms, said arms cooperating with the shiftable storage lines to select the desired storage line, and cam plates cooperating with the engaging arms to impart shifting movement to said line to engage and disengage the desired set of storage elements with and from the connecting means.

5. In a machine of the class described, the combination of a plurality of account-storing means; an add-subtract totalizer; means for transferring amounts from said account-storing means to the add-subtract totalizer and vice versa, said means including connecting means intermediate the totalizer and the account-storing means and means to drive the connecting means to transfer amounts; means to control the engaging and disengaging of the add-subtract totalizer with and from the connecting means; selecting plates carrying engaging arms; cam plates cooperating with the engaging arms to control the engaging and disengaging of the account-storing means with and from the connecting means; means for operating said selecting plates and cam plates differentially to move the arms into cooperative relation with different amount-storing means to select amount-storing means for engagement with the connecting means; and means operable after the differential positioning of the plates to move the cam plates relative to the selecting plates to cause the engagement of the selected storing means with the connecting means.

6. In a machine of the character described, the combination of an add-subtract totalizer; a plurality of shiftable lines, each line supporting a plurality of denominational sets of storage elements; actuators intermediate the add-subtract totalizer and the storage elements and common to all the lines; means to position the actuators in relation to the sets of storage elements, to select similarly located sets of storage elements, one set on each of the various lines, for actuation thereby; means to control the engaging and disengaging of the add-subtract totalizer with and from the actuators; selecting plates having mounted thereon arms for shifting the storage lines; plates having cam slots which cooperate with the shifting arms; means to move the two sets of plates in unison to move the shifting arms into cooperative relationship with the selected storage line; means to move the cam plates in relation to the other plates to actuate the engaging arms to engage and disengage the selected set of storage elements with and from the actuators; and means to drive said actuators when they are engaged selectively by the balance totalizer and selected storage elements to cause amounts to be transferred from said storage element to the balance totalizer and vice versa.

7. In a machine of the character described, the combination of a balance totalizer; a plurality of groups of interspersed amount-storage sets, the different groups being radially disposed about a common center; actuators to connect the balance totalizer to the storage sets; selectively controlled means to impart one movement to the actuators to aline said actuators with the desired storage sets of the various groups; means engaged with the actuators in any of their alined positions; means to engage and disengage the balance totalizer with and from the means engaged with the actuators; means for selectively engaging and disengaging the various groups of storage sets and the actuators; means to impart one movement to the selective engaging means to select the desired group of storage sets; means to impart another movement to the selective engaging means to engage and disengage the desired storage set with and from the actuators; and means to impart another movement to the actuators in one direction to transfer balances from the selected storage set to the balance totalizer and in another direction to transfer balances from the balance totalizer to the storage set.

8. In a machine of the type having a balance totalizer and means to enter positive or negative items in the balance totalizer, the combination of a plurality of groups of storage sets; a set of actuators common to the different storage sets and the balance totalizer; selectively controlled means to position the actuators laterally in relation to the different storage sets of the various groups, to select the different storage sets in the various groups for possible actuation thereby; means operable by said actuators in any of their lateral positions; means to control engaging and disengaging of the balance totalizer with and from the entering means and the means operable by the actuators; a device having one movement to select the desired group of storage sets, and another movement to impart engaging and disengaging movement to said desired group, to control engaging and disengaging of the selected storage set with and from the actuators; and means to impart a movement to the actuators in one direction to transfer an item from the balance totalizer to the selected storage set and in an opposite direction to transfer an item from a selected storage set to the balance totalizer.

9. In a machine of the class described having a balance totalizer, the combination of a plurality of groups of amount-storage sets; a set of actuators common to the different groups of storage sets and the balance totalizer; selectively controlled means to position the actuators laterally in relation to the different storage sets; long pinions operated by said actuators in any of their lateral positions; means to control engaging and disengaging of the balance totalizer with and from the long pinions; a device, comprising selecting plates having mounted thereon engaging arms to select and impart engaging and disengaging movement to the desired group of storage sets, and cam plates to operate the engaging arms; means to impart one movement to the device to move the engaging arms into cooperative relationship with the desired group of storage sets; means to move the cam plates in relation to the other plates to operate the engaging arms to engage and disengage the selected storage sets with and from the actuators; and means to drive the actuators in one direction to transfer amounts from the balance totalizer to the storage sets and in the opposite direction to transfer amounts from the storage sets to the balance totalizer.

10. In a machine of the class described, having a balance totalizer, the combination of a plurality of groups of storage elements; actuators common to all the storage elements and the balance totalizer; key-controlled means to shift the actuators laterally in relation to the storage elements, to select certain of said elements in each group for possible actuation thereby; means effective in any lateral position of the actuators for connecting the actuators to the balance totalizer; a device comprising selecting plates having mounted thereon engaging arms common to all the groups of storage elements, and cam plates to impart engaging movement to said arms; key-controlled means to impart a certain movement to the device to move the engaging arms into cooperative relationship with the selected group of storage elements; locking plates connected to said selecting plates; shifting plates connected to the cam plates; means, including a cam and members operated thereby, certain of said members cooperating with said locking plates to lock the selecting plates to retain the engaging arms in cooperative relationship with the selected storage elements, and other of said members cooperating with said shifting plates to move the cam plates relatively to the selecting plates to cause the arms to engage the selected storage elements with the actuators; and means to impart a movement to the actuators in one direction to transfer an item from the balance totalizer to the selected storage elements and in an opposite direction to transfer an amount from selected storage elements to the balance totalizer.

11. In a machine of the class described, the combination of a plurality of groups of amount-storage elements; actuators for entering items in the storage elements; means to impart one movement to the actuators to select the different storage elements for actuation thereby; a device including selecting plates having mounted thereon engaging arms, said engaging arms common to all the groups of storage elements, and cam plates to impart engaging movement to the engaging arms; means to impart a certain movement to the device to move the arms into cooperative relationship with the selected group of storage elements; means to retain the selecting plates in moved position and to simultaneously move the cam plates relatively thereto to cause the arms to engage the selected set of storage elements with the actuators; and means to impart another movement to the actuators to enter an item in the selected storage elements.

12. In a machine of the class described, the combination of an item-entering device; a plurality of groups of storage elements, said groups shiftable from a non-working position to a working position, to connect the storage elements to the item-entering device; means to secure the storage elements against displacement when in non-working position; a selecting plate; two arms on the plate, one to operate the securing means, the other to impart shifting movement to the selected group of storage elements; a plate having cam slots therein cooperating with the arms; means to rotate the plates various predetermined extents to move the arms into cooperative relationship with the desired group of storage elements and the securing means therefor; means to lock the selecting plate in set position and to rotate the cam plate relatively thereto to actuate the arms to connect the selected storage elements to the item-entering device and to disengage the securing means from the storage elements when said elements are connected to the item-entering device.

13. In a machine of the class described, the combination of a plurality of groups of storage elements, said groups shiftable from a non-working to a working position; means to secure the storage elements against displacement when in a non-working position; a selecting plate; two arms carried by the selecting plate, one to operate the securing means, the other to impart shifting movement to the various groups of storage elements; an operating plate for the arms; means to rotate both of the plates various predetermined extents to move the arms into cooperative relationship with the desired group of storage elements and the securing means therefor; and means to lock the selecting plate in set position and to simultaneously rotate the operating plate relatively thereto to actuate the arms to shift the selected group of storage elements from non-working to working position and to move the securing means therefor to ineffective position, when said group of storage elements arrives in working position.

14. In a machine of the class described, the combination of a plurality of groups of denominational sets of storage devices; a balance totalizer to compute amounts to be entered in the storage devices; actuators intermediate the balance totalizer and the plurality of groups of storage devices; means to shift the actuators opposite similar storage devices in the sets of storage devices in the various groups; means to connect the balance totalizer with the actuator in all of its shifted positions; members movable in relation to the groups of storage devices to select one of said groups of devices so that the selected elements of that group can be engaged with the actuators; means on the members movable relatively thereto to engage the selected storage devices in the selected group of storage devices with the actuators; and means to drive the actuators to selectively operate the balance totalizer and the selected storage devices to transfer amounts from said storage devices to the balance totalizer and vice versa when computing new balances.

15. In a machine of the class described, the combination of a balance totalizer; item entering means including differential mechanism for entering amounts in said totalizer; a plurality of groups of denominational sets of storage devices; means intermediate the balance totalizer and the various groups of storage devices; means to impart selecting movement to the intermediate means to select similar devices in each group of storage devices; engaging means operable to select one of said groups of devices for engagement and to engage the selected devices in the selected group with the intermediate means; means to impart selecting movement to said engaging means; means to impart engaging and disengaging movement to said engaging means; means to alternately engage said balance totalizer with the differential mechanism and said intermediate means; and means to impart movement to the intermediate means in one direction to transmit amounts from the balance totalizer to a selected storage device and to impart movement in another direction to transmit amounts from the selected storage device to the balance totalizer, the operation of the various means by their operating means being so coordinated that the engaging means for the balance totalizer and storage device cause these to engage the intermediate means at the end of one operation, and, at the beginning of the next operation while the differential mechanism is being set according to an item amount, the intermediate means is operated in said one direction to transmit the amount standing on the balance totalizer at the end of said one operation to said storage device, after which said storage device is disengaged from the intermediate means and the storage device selecting and engaging means and the intermediate means are operated to select and engage with said intermediate means a storage device to be used in said next operation and said intermediate means is operated in said other direction to transmit the amount from the last-mentioned storage device to said balance totalizer, and after the differential mechanism has been set, said engaging means for said balance totalizer causes the balance totalizer to be disengaged from the intermediate means and be engaged with the differential mechanism to receive an item amount entry therefrom, and after the item amount entry, and near the end of said next operation, as mentioned previously, said engaging means for the balance totalizer is operated to disengage the balance totalizer from the differential mechanism and engage the balance totalizer with the intermediate means.

16. In a machine of the class described, the combination of amount printing type means; differentially operable means to set said type means; a balance totalizer; means operated by the balance totalizer for controlling the movement of the differentially operable means in setting said type means; a plurality of storage groups, each group comprising a plurality of denominational sets of interspersed storage elements; a denominational set of auxiliary actuators common to and engageable by the sets of storage elements in all the groups; manually controlled means to position the auxiliary actuators laterally in relation to the storage elements to select particular sets of elements for actuation thereby; long pinions constantly engaged with the auxiliary actuators in all of their laterally shifted positions; a selecting plate; an arm mounted on the selecting plate to impart an engaging and disengaging movement to any one of said groups to engage and disengage the desired set of storage elements with and from the auxiliary actuators; means to secure the storage elements against displacement when disengaged from the auxiliary actuators; a second arm mounted on said selecting plate for operating said securing means; an operating plate for the arms; means to move the plates in unison to move the arms into cooperative relationship with the desired group of storage elements and the securing means therefor; means operable to lock the selecting plate in set position and to simultaneously move the operating plate relatively thereto to actuate the arms to cause engaging of the selected set of storage elements with the auxiliary actuators and to render the securing means ineffective, when a selected set of storage elements is engaged with the auxiliary actuators; means to impart rotary movement to the auxiliary actuators in one direction to cause an amount in a selected set of storage elements to be transferred to the balance totalizer to enable the balance totalizer to control the setting of the type means according to said amount and to impart rotary motion to the auxiliary actuators in the opposite direction to transfer an amount from the balance totalizer to the selected set of storage elements; a shiftable framework for supporting the balance totalizer; and manually controlled means to shift the framework to selectively engage the balance totalizer with the long pinions or the differentially operable means and the control means therefor to enable the balance totalizer to be selectively actuated by the auxiliary actuators in said amount transferring operations and to be driven by the differentially operable means and control the extent of the movement of the differentially operable means in setting the type means according to the amount transferred to the balance totalizer from a selected set of storage elements.

17. In a machine of the class described, the combination of a balance totalizer; differential means to enter positive and negative amounts into said balance totalizer; a plurality of storage groups, each group comprising a plurality of denominational sets of interspersed storage elements; a denominational set of auxiliary actuators common to and engageable by the sets of storage elements in all the groups; manually controlled means to position the auxiliary actuators laterally in relation to the storage elements to select particular sets of elements for actuation thereby; long pinions constantly engaged with the auxiliary actuators in all of their laterally shifted positions; a selecting plate; an arm mounted on the selecting plate to impart an engaging and disengaging movement to any one of said groups to engage and disengage the desired set of storage elements with and from the auxiliary actuators; means to secure the storage elements against displacement when disengaged from the auxiliary actuators; a second arm mounted on said selecting plate for operating said securing means; an operating plate for the arms; means to rotate the plates in unison to move the arms into cooperative relationship with the desired group of storage elements and the securing means therefor; means operable to lock the selecting plate in set position and to simultaneously move the operating plate relatively thereto to actuate the arms to cause engaging of the selected set of storage elements with the auxiliary actuators and to render the securing means ineffective, when a selected set of storage elements is engaged with the auxiliary actuators; means to impart rotary movement to the auxiliary actuators in one direction to cause an amount in a selected set of storage elements to be transferred to the balance totalizer and to impart rotary motion to the auxiliary actuators in the opposite direction to transfer an amount from the balance totalizer to the selected set of storage elements; a shiftable framework for supporting the balance totalizer; and manually controlled means to shift the framework to selectively engage the balance totalizer with the differential means or the long pinions to enable the balance totalizer to be selectively actuated by the differential means to receive an amount or by the auxiliary actuators in said amount transferring operations.

18. In a machine of the class described, the combination of a balance totalizer; type members; means controlled by the balance totalizer for setting the type members according to an amount on said balance totalizer; a plurality of storage groups, each comprising a plurality of denominational sets of storage elements; a denominational set of actuators common to and engageable by the sets of storage elements in all the groups; manually controlled means to position the denominational set of actuators laterally in relation to the storage elements to select particular sets of said elements for actuation thereby; long pinions engaging said set of actuators in any of said lateral positions; means to secure the storage elements against displacement when they are disengaged from the denominational set of actuators; a selecting plate; two arms mounted on the selecting plate, one to operate the securing means, the other to impart shifting movement to a selected group of storage elements, to engage and disengage the desired set of storage elements with and from the denominational set of actuators; an operating plate for the arms; means to rotate the plates in unison to move the arms into cooperative relationship with the desired group of storage elements and the securing means therefor; means to lock the selecting plate in set position and to simultaneously move the operating plate relatively thereto to actuate the arms to control engaging and disengaging of the selected set of storage elements with and from the denominational set of actuators and to render the securing means ineffective, when the selected set of storage elements is engaged with the actuators; means to shift the totalizer to cause the totalizer to be selectively engaged with and disengaged from the type member setting means or the long pinions; and means to drive the denominational set of actuators in one direction to transfer an amount from the balance totalizer to a selected set of storage elements and in the reverse direction to transfer an amount from a selected set of storage elements to the balance totalizer; the operation of the various means enabling the type members to be set according to an amount on a selected set of storage elements and being so coordinated that the engaging means for the balance totalizer and the set of storage elements are operated to cause these to engage respectively the long pinions and the denominational set of actuators at the end of an operation, and, at the beginning of the next operation, the set of actuators is operated in said one direction to clear the balance totalizer and transfer the amount to the set of storage elements, after which the set of storage elements is disengaged from the set of actuators and the selecting plate and the set of actuators are operated to select the set of storage elements from which the amount is to be set on the type members, and the engaging means for the storage elements is operated to engage the selected set of storage elements with the set of actuators, next, the set of actuators is operated to transmit the amount from the storage elements to the cleared balance totalizer, and, after the transmission, the balance totalizer engaging means is operated to disengage the balance totalizer from the long pinion and engage the balance totalizer with the type member setting means, which operates to set the type members according to the amount transferred to the balance totalizer, and finally, the engaging means for the balance totalizer disengages the totalizer from the setting means and returns the totalizer into engagement with the long pinions.

19. In a machine of the class described having a balance totalizer and key-controlled differential means for entering amounts in said totalizer, the combination of a plurality of amount storage devices; means to transmit values from said balance totalizer to said storage devices and from said devices to said totalizer; means to operate said transmitting means; means for selecting and engaging said storage devices with said transmitting means; means to operate said storage device selecting and engaging means; means to alternately engage the totalizer with the key-controlled differential means and with said transmitting means; and means to operate the totalizer engaging means, said operating means for the engaging means for said totalizer and storage device causing these to engage the transmitting means at the end of one operation, the operating means for said transmitting means operating at the beginning of the next operation to cause the transmitting means to transfer an amount from said totalizer to said storage device, said operating means for the selecting and engaging means thereafter operating the storage device selecting and engaging means for disengaging the storage device to which the amount has been transferred, then selecting a storage device desired to be used in said next operation and engaging said device with the transmitting means, said operating means for the transmitting means then operating the transmitting means to transfer the amount from the second-mentioned storage device to the balance totalizer, said operating means for the engaging means for the totalizer then operating the engaging means for shifting the totalizer to engage the key-controlled differential means to receive an entry therefrom and after the entry and near the end of the next operation, as mentioned previously, engaging the totalizer with the transmitting means.

20. In a machine of the class described, the combination of a balance totalizer; differentially operable means for withdrawing amounts from said totalizer under control of said totalizer; type members settable by said differentially operable means; a plurality of groups of denominational sets of storage devices; means intermediate the balance totalizer and the various groups of storage devices; means to impart selecting movement to the intermediate means to select similar devices in each group of storage devices; engaging means operable to select one of said groups of devices for engagement and to engage and disengage the selected devices in the selected group with and from the intermediate means; means to impart selecting movement to said engaging means; means to impart engaging and disengaging movement to said engaging means; means to alternately engage the balance totalizer with the differentially operable means and the intermediate means; and means to impart movement to the intermediate means in one direction to withdraw an amount from the balance totalizer and transmit this amount to a selected storage device and to impart movement in another direction to withdraw an amount from a storage device and transmit said amount to the balance totalizer, the operation of the various means by their operating means being so coordinated that the engaging means for the balance totalizer and storage device cause these to engage the intermediate means at the end of one operation, and, at the beginning of the next operation, the intermediate means is operated in said one direction to withdraw the amount standing on the balance totalizer at the end of said one operation, to clear said balance totalizer and transmit the amount to the storage device, after which the storage device is disengaged from the intermediate means and the storage device selecting and engaging means and the intermediate means are operated to select and engage with said intermediate means a storage device to be used in said next operation and said intermediate means is operated in said other direction to withdraw an amount from the last-mentioned storage device and transmit said amount to the previously cleared balance totalizer and after the amount has been set on the balance totalizer said engaging means for the balance totalizer is operated to cause the balance totalizer to be disengaged from the intermediate means and be engaged with the differentially operable means which withdraws the amount therefrom and sets the type members accordingly and after the setting of the type members said balance totalizer engaging means is operated, and, as mentioned previously, disengages the balance totalizer from the differentially operable means and engages the balance totalizer with the intermediate means.

WILLIAM H. ROBERTSON.